US010867335B2

(12) United States Patent
Desrosiers

(10) Patent No.: US 10,867,335 B2
(45) Date of Patent: *Dec. 15, 2020

(54) METHOD AND SYSTEM FOR RESERVING FUTURE PURCHASES OF GOODS

(71) Applicant: Rejean Desrosiers, Mississauga (CA)

(72) Inventor: Rejean Desrosiers, Mississauga (CA)

(*) Notice: Subject to any disclaimer, the term of this patent is extended or adjusted under 35 U.S.C. 154(b) by 158 days.

This patent is subject to a terminal disclaimer.

(21) Appl. No.: 16/130,851

(22) Filed: Sep. 13, 2018

(65) Prior Publication Data

US 2020/0090253 A1  Mar. 19, 2020

(51) Int. Cl.
*G06Q 30/06* (2012.01)

(52) U.S. Cl.
CPC ..... *G06Q 30/0623* (2013.01); *G06Q 30/0603* (2013.01); *G06Q 30/0635* (2013.01); *G06Q 30/0639* (2013.01); *G06Q 30/0643* (2013.01)

(58) Field of Classification Search
CPC .......... G06Q 30/0635; G06Q 30/0623; G06Q 30/0639; G06Q 30/0603; G06Q 30/0643
USPC ............... 705/26.1, 26.81, 27.1, 26.61, 26.9
See application file for complete search history.

(56) References Cited

U.S. PATENT DOCUMENTS

| | | | | |
|---|---|---|---|---|
| 6,868,396 B2* | 3/2005 | Smith | ................... | G06Q 10/087 705/26.9 |
| 9,462,028 B1* | 10/2016 | Levinson | ................ | H04L 63/08 |
| 2007/0150588 A1* | 6/2007 | Ghadialy | ............... | G06Q 30/02 709/224 |
| 2009/0192945 A1* | 7/2009 | Perpina | ................... | G06Q 30/06 705/80 |
| 2010/0241684 A1* | 9/2010 | Cheng | ..................... | H04L 51/38 709/202 |
| 2012/0030068 A1* | 2/2012 | Thomas | ............. | G06Q 30/0601 705/27.1 |
| 2013/0151511 A1* | 6/2013 | Yamahara | ............. | G06F 16/248 707/723 |
| 2014/0289236 A1* | 9/2014 | Agarwal | ............. | G06F 16/3334 707/725 |

(Continued)

FOREIGN PATENT DOCUMENTS

CN 104657867 A * 5/2015 ............. G06Q 30/00

OTHER PUBLICATIONS

Article, Reigning peterbilt north american dealer of the year, TLG peterbilt, expands award-winning service with newly unveiled responsive website. (May 4, 2016). ICT Monitor Worldwide Retrieved from Dialog database on Aug. 1, 2020.*

*Primary Examiner* — Yogesh C Garg
(74) *Attorney, Agent, or Firm* — Select Patents; Ashkon Cyrus

(57) ABSTRACT

A server network device provides to a shopper client network device via a computer network, an option to search by retailer, manufacturer, and wholesaler. The shopper client can filter the results by their geographic area. Results are show by new arrivals first, items on sale second, and standard inventory third. A user wishlist is provided to each user, wherein a user can add items to their user wishlist and make it the first choice in their wishlist. An option to purchase the item is provided wherein the user is then redirected to a vendor website. From the same search results page, and with only 1 click, users can filter by upcoming season. Items in a user's wishlist can be selected as private or public (the public one being searchable by other members).

11 Claims, 33 Drawing Sheets

(56) References Cited

U.S. PATENT DOCUMENTS

2016/0300144 A1* 10/2016 Santhanam ........ G06Q 30/0631
2017/0236160 A1*  8/2017 Oberoi ............... G06Q 30/0269
                                                    705/14.66

* cited by examiner

FIG 13

*speedBrowse™*

*speedBrowse™*

Results: 8

| | | | |
|---|---|---|---|
| Macy's | 1800 9th St N | Naples | Florida |
| Target | 2415 Tarpon Bay Blvd | Naples | Florida |
| Nordstrom | 5489 Tamiami Trail N | Naples | Florida |
| Walmart | 3451 Tamiami Trail E | Naples | Florida |
| Payless Shoes | 5072 Airport Pulling Rd N | Naples | Florida |
| Dick's Sporting Goods | 5955 Naples Blvd | Naples | Florida |

SEARCH

1. Results of the stores selling the product in Naples displayed on the Speedbrowse website
2. Clicking "SEARCH" will search all stores with "ONLY ONE CLICK" no matter how many stores... even thousands etc
3. This is achieved with the "SpeedBrowse Plugin" being on the Manufacturer's Website. The plugin also allows them to have their entire product line for each of the 4 shopping seasons of the year to be listed as such on their own website.

METHOD AND SYSTEM FOR RESERVING FUTURE PURCHASES OF GOODS

TECHNICAL FIELD

This invention relates to reserving goods or services over a computer network. More specifically, this invention relates to providing upcoming product reservations for goods or services via a computer network such as the Internet or an intranet.

BACKGROUND OF THE DISCLOSURE

Online comparison shopping is tedious, and it's almost impossible to stay up to date on product availability. The number of online vendors exceeds the amount of time an average person has to go through them all. The typical shopper has to manually catalog the results when comparison shopping, however maintaining and managing Wishlists across multiple retail sites is laborious. It is also difficult to search directly by manufacturer in a simple and efficient manner, wherein a user can rapidly find stores that are carrying their desired item Aggregation systems such as Amazon use preformulated algorithms which may not work for many of the small vendors with unique products people might want to consider. Manufacturers also have difficulty knowing which areas they should warehouse their products in. An item might have more demand in one geographic area than another. Currently, manufacturers have to estimate where to warehouse their products based on previous trends which may be inaccurate or out of date.

Thus, there exists a need in the art to address the problems described above. Such a system would allow a shopper to search by retailer, manufacturer, and wholesaler, locate vendors that "currently" sell that item and buy directly from them through a convenient interface. Additionally, based on the exact same search, with only one click, the system should allow users to locate vendors that will be selling said item or similar ones as a "New Arrival" in any revolving "Upcoming 3 Shopping Seasons", and to reserve the item and buy directly once the item is available for purchase.

SUMMARY OF THE DISCLOSURE

In accordance with preferred embodiments of the present invention, some of the problems associated with comparison shopping are overcome. A method and system for reserving future purchases of goods or services is presented.

A method for providing a rapid reservation of items is provided. A server network device provides to a shopper client network device via a computer network, an option to search by retailer, manufacturer, and wholesaler. The shopper client can filter the results by their geographic area. Results are show by new arrivals first, items on sale second, and standard inventory third. A user wishlist is provided to each user, wherein a user can add items to their user wishlist and make it their first choice in their wishlist. An option to purchase the item is provided wherein the user is then redirected to a vendor website. From the same search results page, and with only 1 click, users can filter by upcoming 3 shopping seasons. Items in a user's wishlist can be selected as private or public (the public one being searchable by other members).

The present disclosure provides a system that displays search results by both retailers as well as manufacturers and wholesalers. Users can use one platform to search "Current New Arrivals" from a large number of stores and filter with one click. Based on the same search criteria and with one click, users can change the search results from: 1) "Current New Arrivals" 2) "Items On Sale" 3) "Standard Inventory" 4) "Revolving Upcoming 3 Shopping Seasons" and have the ability to use multiple filters in each respective result.

The present disclosure further provides a "Wishlist" to accommodate different single products with their specific color and/or style/model from a large number of vendors. Additionally users have an option to select an item as their first choice and the option to reserve said item, and display the item as private or public. In one embodiment, the public wishlist is searchable by third party users such as friends and family member. Users further have the ability to receive offers from vendors based on their choices and remain anonymous.

The present disclosure further provides a system that allows Retailers to have their New Arrivals, Items On Sale and Standard Inventory to be searchable by product name, thus increasing exposure to previously unknown users. Retailers further can constantly showcase their New Arrivals for three upcoming shopping seasons and have them be searchable, without any item being associated with a URL. Retailers further can have their upcoming products to be reserved and added to wishlist as a specific color or model, though facilitating their future inventory management with precise analytics. Retailers further can have analytics for each product in each color or model in each zip or postal code around the world and can send them bulk or personalized offers. Retailers further can have all items be simultaneously posted on their own website.

The present disclosure additionally allows displaying search results by Manufacturers and Wholesalers. For shopper Users, this allows for conducting fast searches by being able to use one platform to search any "Current and Upcoming New Arrivals" items from an unlimited number of manufacturers or wholesalers around the world. Then with a single click, users have the ability to filter results by any one of the upcoming yearly shopping seasons (when selecting current season that will be the items sold as "Current New Arrivals" in the retail stores). From the search results, users can choose an item from any manufacturer or wholesaler and find a list all retailers that are selling that item, with specific geotargeting to find a nearby location. From the result list of Retailers selling that item, the ability users can search that item from all listed retailers (whatever is the number of Retailers) with one click. Then, with one click, users can filter by price point and can buy the item directly from the store or store's website.

For Manufacturers and Wholesalers, the present disclosure provides the ability to sustain and increase sales by directing the users directly to all the retailers selling their items within the geographic area chosen by the users. Manufacturers and wholesalers can better recommend to their Retailers what to purchase based on their retail location as they will have direct local consumers trends and analytics of each item by color and/or by model and they will have it for every zip or postal code in the world. Manufacturers and wholesalers can also increase their sales as "New Retailers" can find them when conducting searches of items, they sell. This allows for better control on what and how many items to manufacture with the ability to find out which items are the most and least popular by model and/or color directly from the consumers.

By exposing their future production of items directly to the retail market, manufacturers and wholesalers will have an opportunity to have consumers to reserve the items directly on the retailer's websites selling their production. Thus, these users can showcase their New Production for the 3 revolving upcoming shopping seasons and have them searchable without any of the item being associated to a URL. Additional, using a plugin, such users have the ability to have all items they upload on the system to be simultaneously posted on their own website.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

FIG. 13 is a manage products interface according to an embodiment of the present disclosure.

FIG. 23 is a user interface displaying results of the stores selling a targeted product from a manufacturer or wholesaler.

FIG. 27 is a user interface displaying live product analytics across a range of single products.

DETAILED DESCRIPTION OF THE DISCLOSURE

Figure 1:
FIG. 1 is a user interface illustrating a product reservation system according to one exemplary embodiment of the present invention.

It should be understood at the outset that, although exemplary embodiments are illustrated in the figures and described below, the principles of the present disclosure may be implemented using other techniques. The present disclosure should in no way be explicitly limited to the exemplary implementations and techniques illustrated in the drawings and described below. Additionally, unless otherwise specifically noted, articles depicted in the drawings are not necessarily drawn to scale.

FIG. 1 is a user interface illustrating a product reservation system according to one exemplary embodiment of the present invention. The product reservation system includes one or more client network devices. The client network devices include, but are not limited to, personal computers, wireless telephones, personal information devices, personal digital assistants, hand-held devices, network appliances, and other types of electronic devices. However, the present invention is not limited to these devices and more, fewer or equivalent types of client electronic devices can also be used. The client network devices can represent shoppers as well as vendors and are in communications with a computer network (e.g., the Internet, intranet, etc.).

Users of the product reservation system can search for a product such as "running shoes" via a search text box 101. Users can search by product name from either: Retailers, Manufacturers, Wholesalers, or Service Providers via a dropdown 102. Users cannot search from more than one supplier at a time (that is, they have to select either retailers, manufacturers, wholesalers, or service provider).

The present disclosure further provides a filtering method wherein a user can filter the results by:
all results;
new arrivals ONLY;

items on sale ONLY;
by color;
by price, low to high and vice versa;
by store name;
by brand or manufacturer.
A user can also filter results by:
Country;
state or province;
city;

Searching by Retailers

Figure 2:
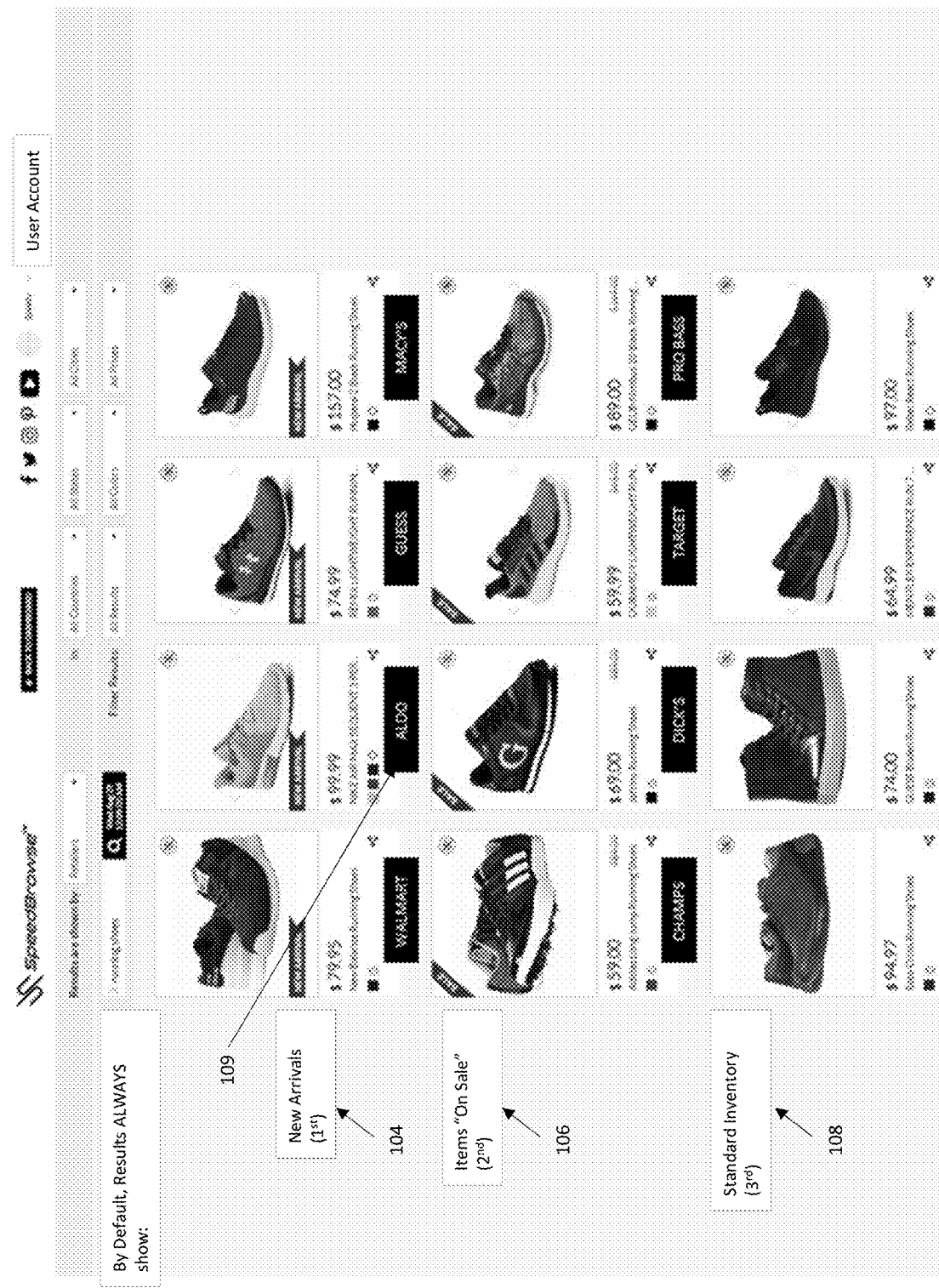
FIG. 2 is a user interface illustrating a search results by retailers according to one exemplary embodiment of the present invention.

A user can search for products by retailer and filter the results as described above. FIG. 2 is a user interface illustrating a search results by retailers according to one exemplary embodiment of the present invention. By Default, the results always show new arrivals 104 first, items on sale 106 second, and standard inventory 108 third. A user can click on an item by clicking on a "Vendor name" button 109. The respective Vendor name button appears for each item. Clicking on the Vendor name button 109 will take the user to the respective item details page.

Figure 3:
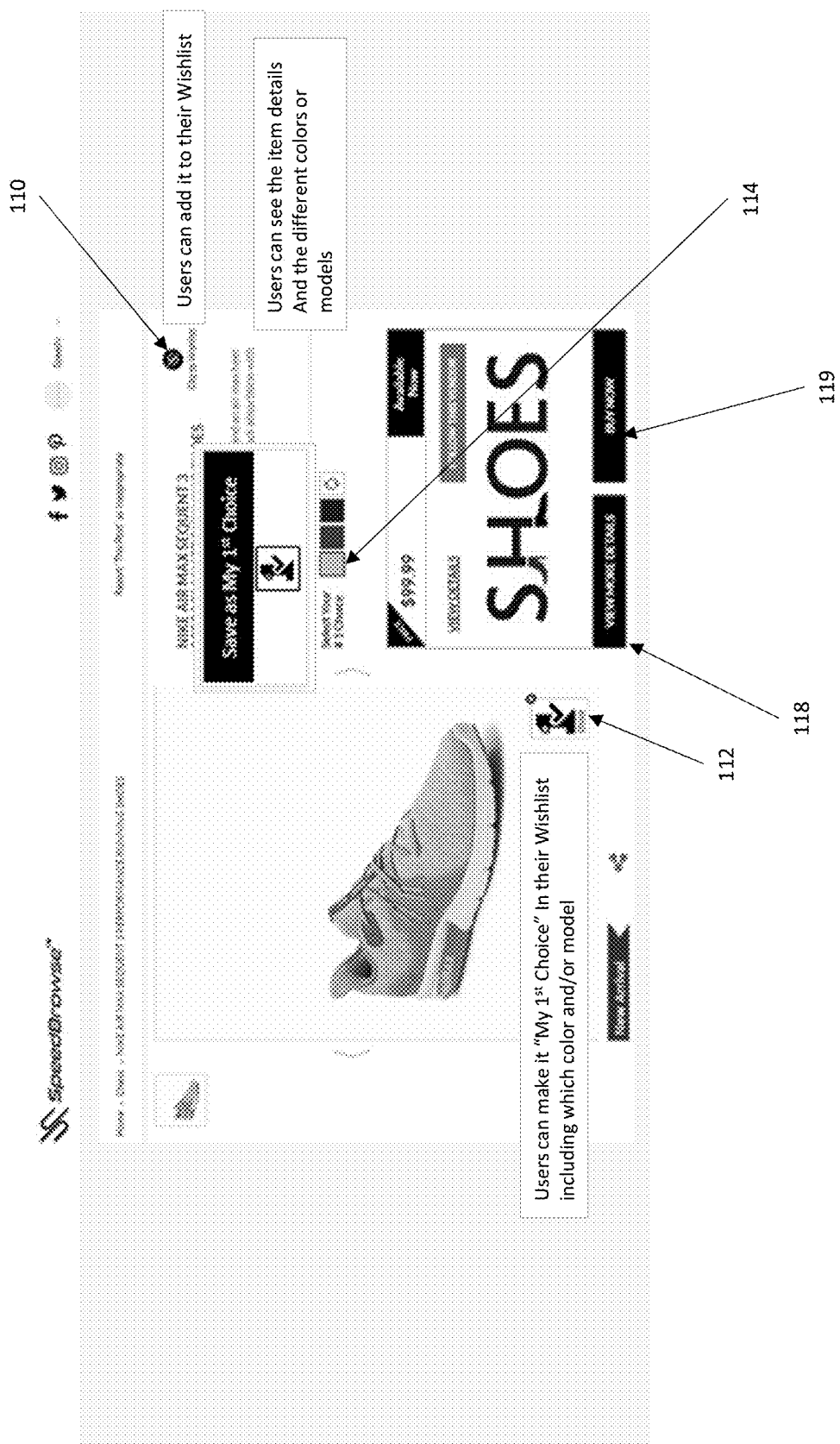
FIG. 3 is a user interface illustrating an items detail page according to an embodiment of the present invention.
Figure 4:
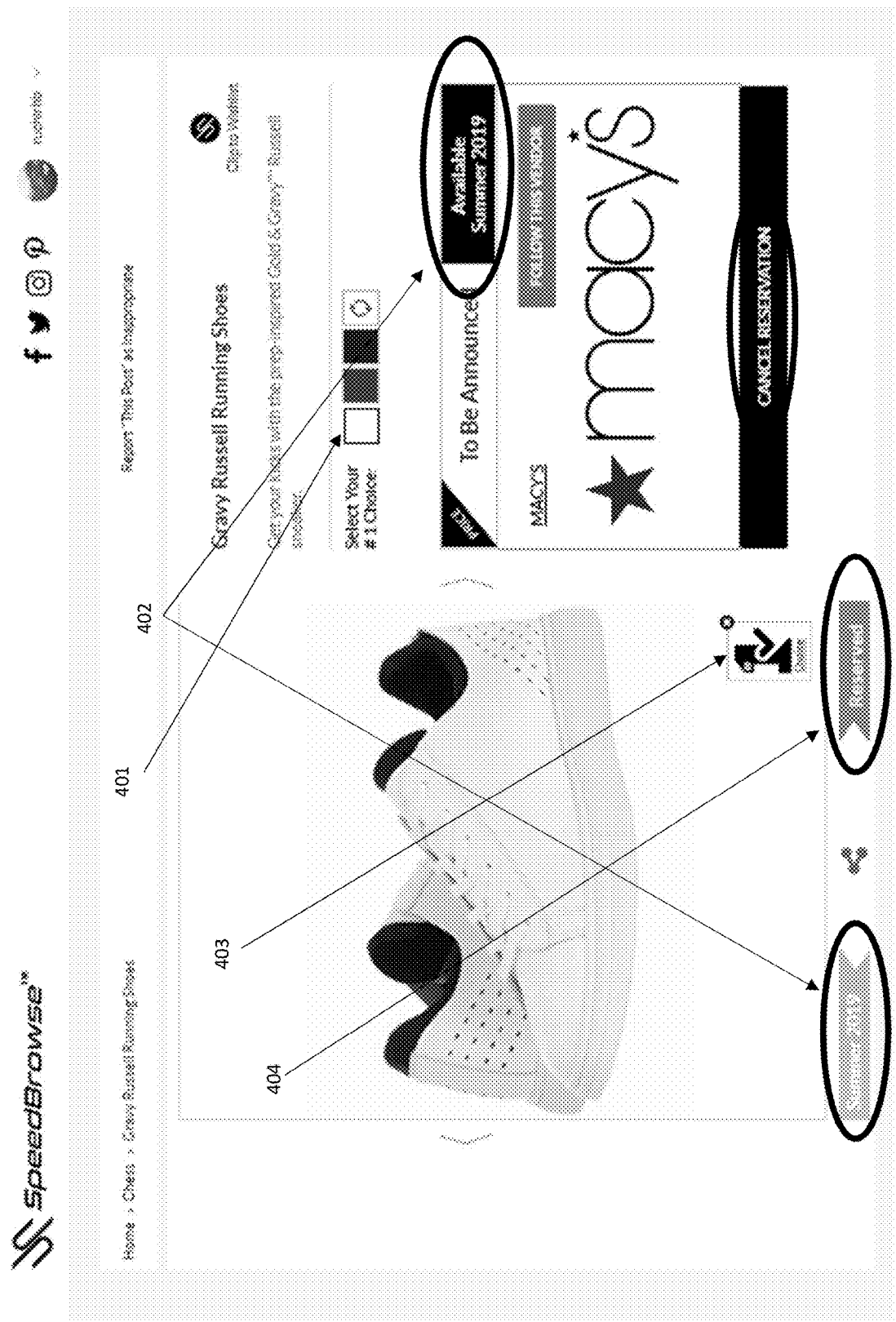
FIG. 4 is a user interface illustrating a reserved item page according to an embodiment of the present invention.

FIG. 3 is a user interface illustrating an items detail page according to an embodiment of the present invention. The present disclosure includes a wishlist which allows shoppers to save their favorite products from multiple sites in one place and make them public or private. According to an embodiment, the public wishlist can be accessed by third party users such as friends or family or family members, such that when they search their wishlist they will be able to see exactly what they want and where it is sold. A user can add an item to their wishlist on an items detail page by pressing wishlist button 110. In a further embodiment, a user can sub-select styles or colors of their favorite product via a color or style panel interface 114 and mark their $1^{st}$ Choice by clicking on their favorite color or style. Once they do, it will be saved in their wishlist as "My $1^{st}$ Choice", including the item color and model. If they save it as public then their friends and family members will know what the user $1^{st}$ choice is 112 and where to get it. In a further embodiment, a user can reserve any upcoming New Arrivals in any revolving upcoming 3 shopping seasons, as shown in FIG. 4. Notification 404 shows a reserved item. A user can see what season an item appears in via season notification panels 402. A user can select their first-choice color via color selector 401. A user can also mark a reservation as their first choice via first choice button 403. If an item is reserved, it shows via reserved panel 404.

In a further embodiment, users can view more details or buy it directly from the respective Vendor selling the product by clicking "View More Details" 118 or "Buy Now" 119 buttons. In one embodiment, users are then redirected to the exact product URL of the Vendor Website.

Figure 5:
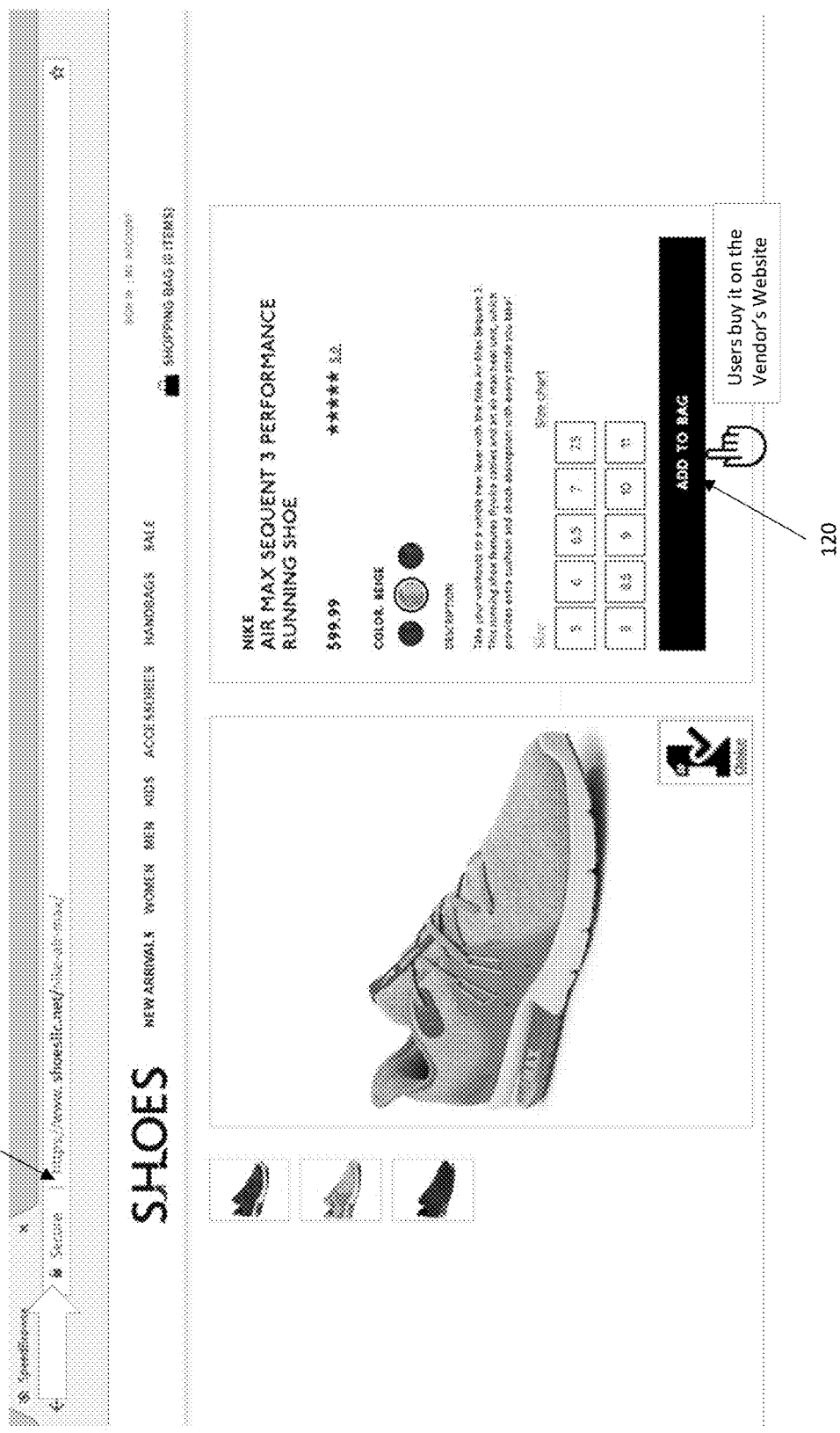
FIG. 5 is a vendor website/

FIG. 5 vendor website selling a product after a user has click "Buy Now" 119. URL 122 shows the product URL on the vendors website. A user can buy the product on the vendor website via add to bag/cart button 120. It can be appreciated that the present disclosure suggests a novel approach of searching products from all vendors at once that are registered on the platform, and linking product results directly to vendor URL addresses. This allows vendors to maintain a level of control over their inventory whilst having the benefit of an aggregated system that increases reservations and sales.

Figure 6:
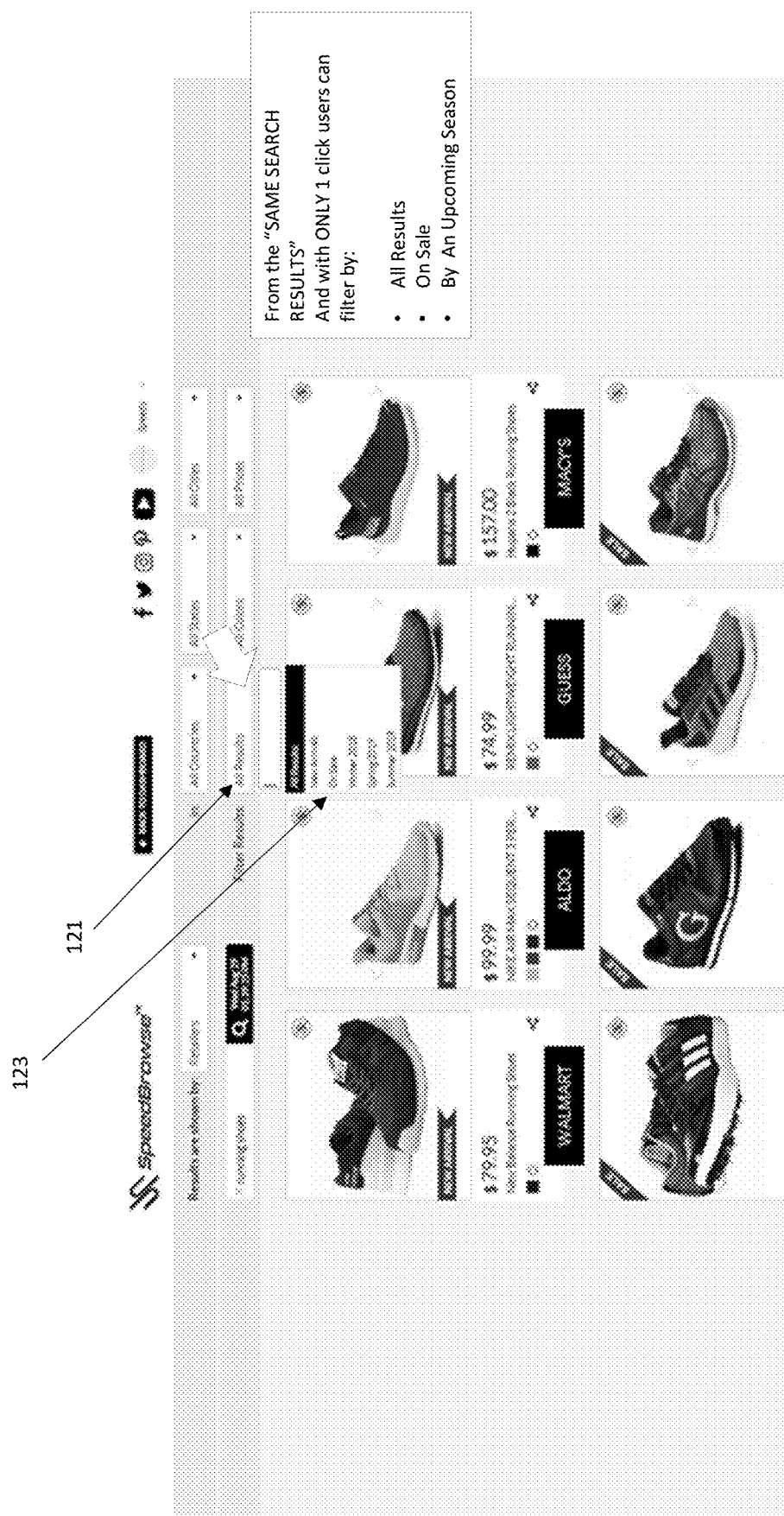
FIG. 6 is a user interface illustrating a filter results feature according to one exemplary embodiment of the present invention.

FIG. 6 is a user interface illustrating a filter results feature according to one exemplary embodiment of the present invention. From the same search results interface, and with ONLY 1 click users can filter by:

All Results
Items On Sale
By Upcoming Shopping Season, following the current shopping season, (i.e. if the current shopping season is Fall 2018 then the 3 upcoming Shopping Seasons would be Winter 2018, Spring 2019, Summer 2019 etc.)

Figure 7:
FIG. 7 is a user interface illustrating a filter results feature according to one exemplary embodiment of the present invention.

In an embodiment, the user can filter the search results via a filter results dropdown 121. Selecting a category via dropdown 123 instantly filters the results and displays the items according to the filter criteria. For example, FIG. 7 shows results filtered by Winter 2018. Only items to be released in the Winter 2018 season are shown as this is the category filter criteria selected in dropdown 123.

Figure 8:
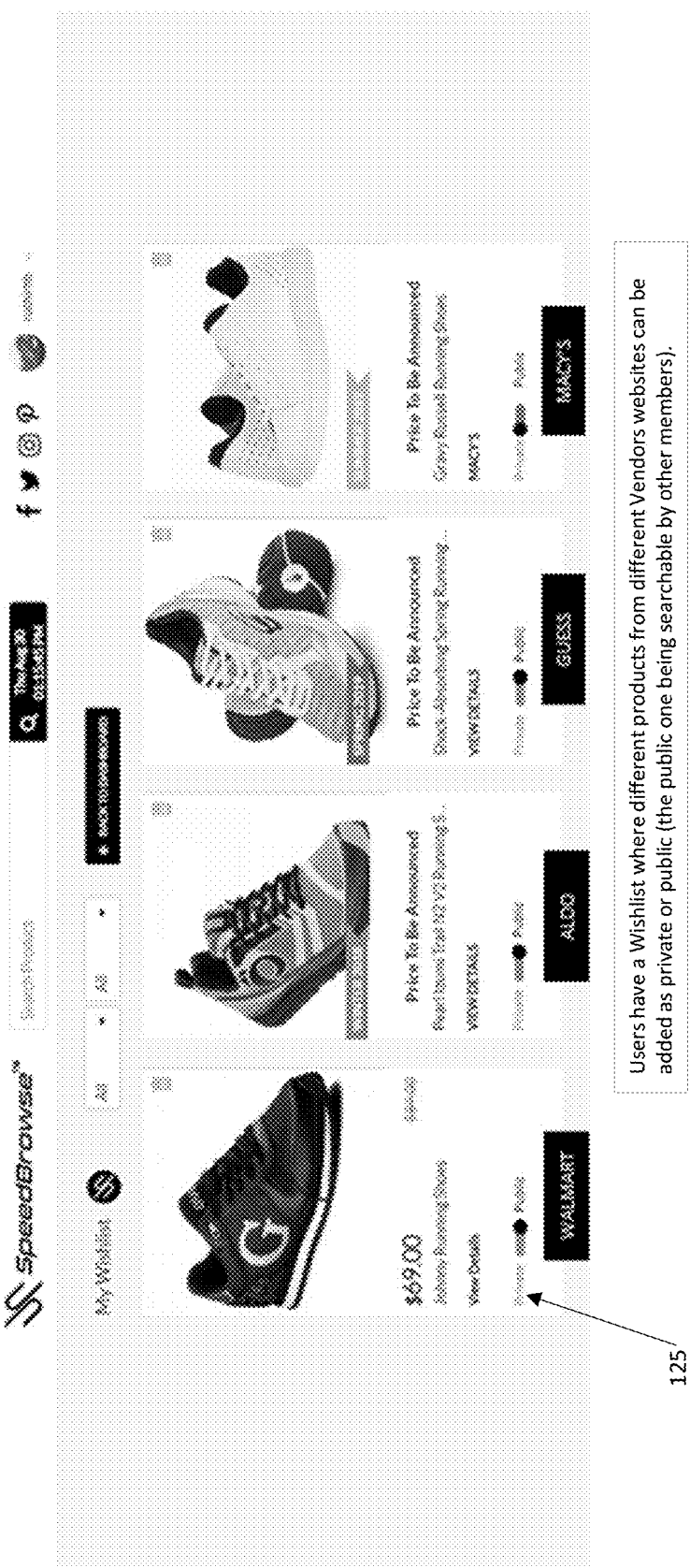
FIG. 8 is a user interface illustrating a user wishlist according to an embodiment of the present disclosure.

FIG. 8 is a user interface illustrating a user wishlist according to an embodiment of the present disclosure. Users have a Wishlist where different products from different Vendors websites can be added as private or public (the public one being searchable by other members). Each item has a toggle 125 where a user can select whether the item is public or private. Users can also view item details directly from their wishlist by clicking the Vendor's name which will take them to the item details interface.

Figure 9:
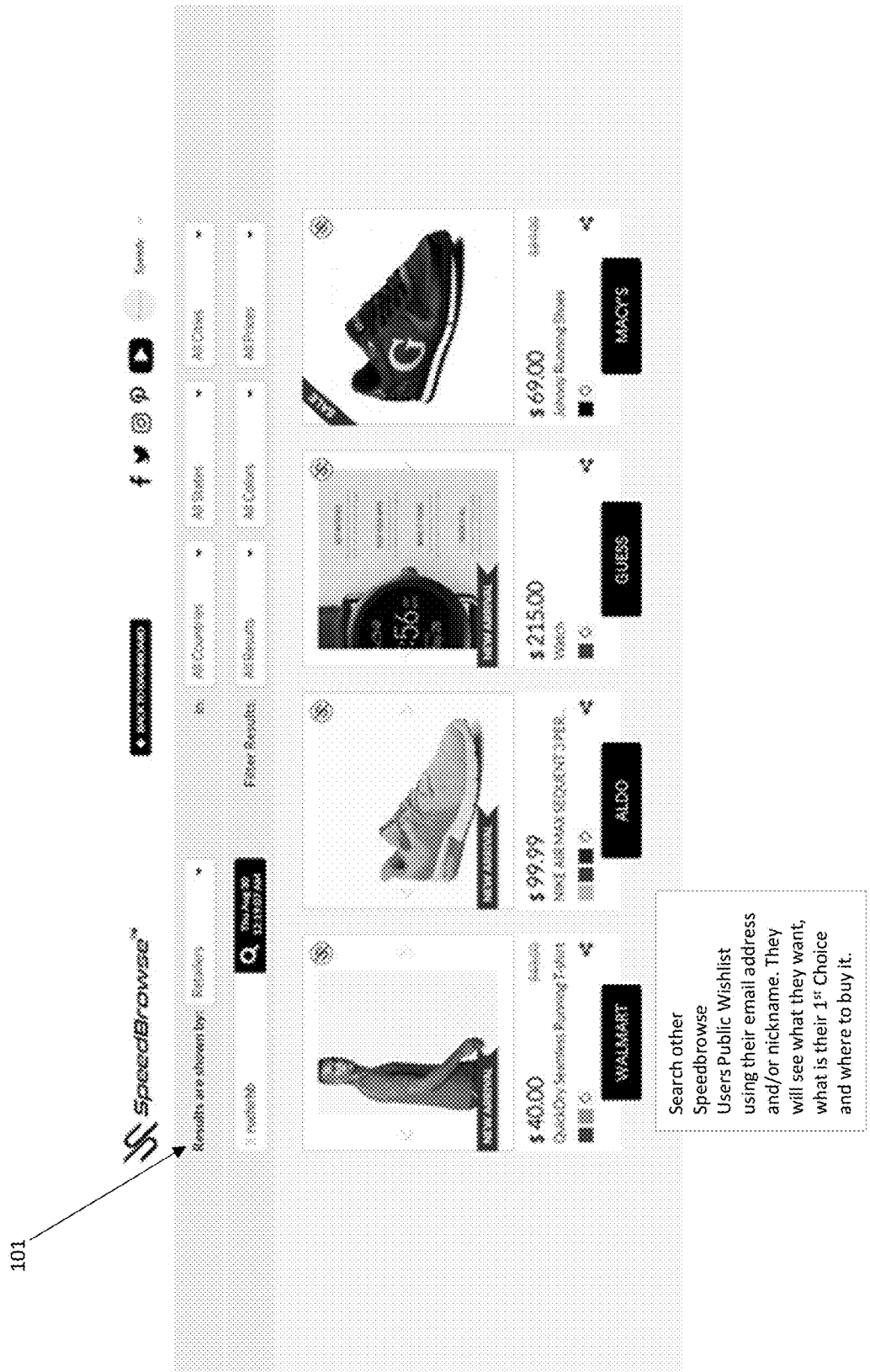
FIG. 9 is a user interface showing a search of a target user and displaying a wishlist of the target user.

The present disclosure also provides for users to search other user's Public Wishlist's using their email address and/or nickname in the same search dialog 101. It can be appreciated that this allows users to see what other users want, what is their first choice and where to buy it. FIG. 9 is a user interface showing a search of a target user and displaying a wishlist of the target user. It can be appreciated that this allows for a fast way to search for third party's desired items no matter which Vendor sells it.

Figure 10:
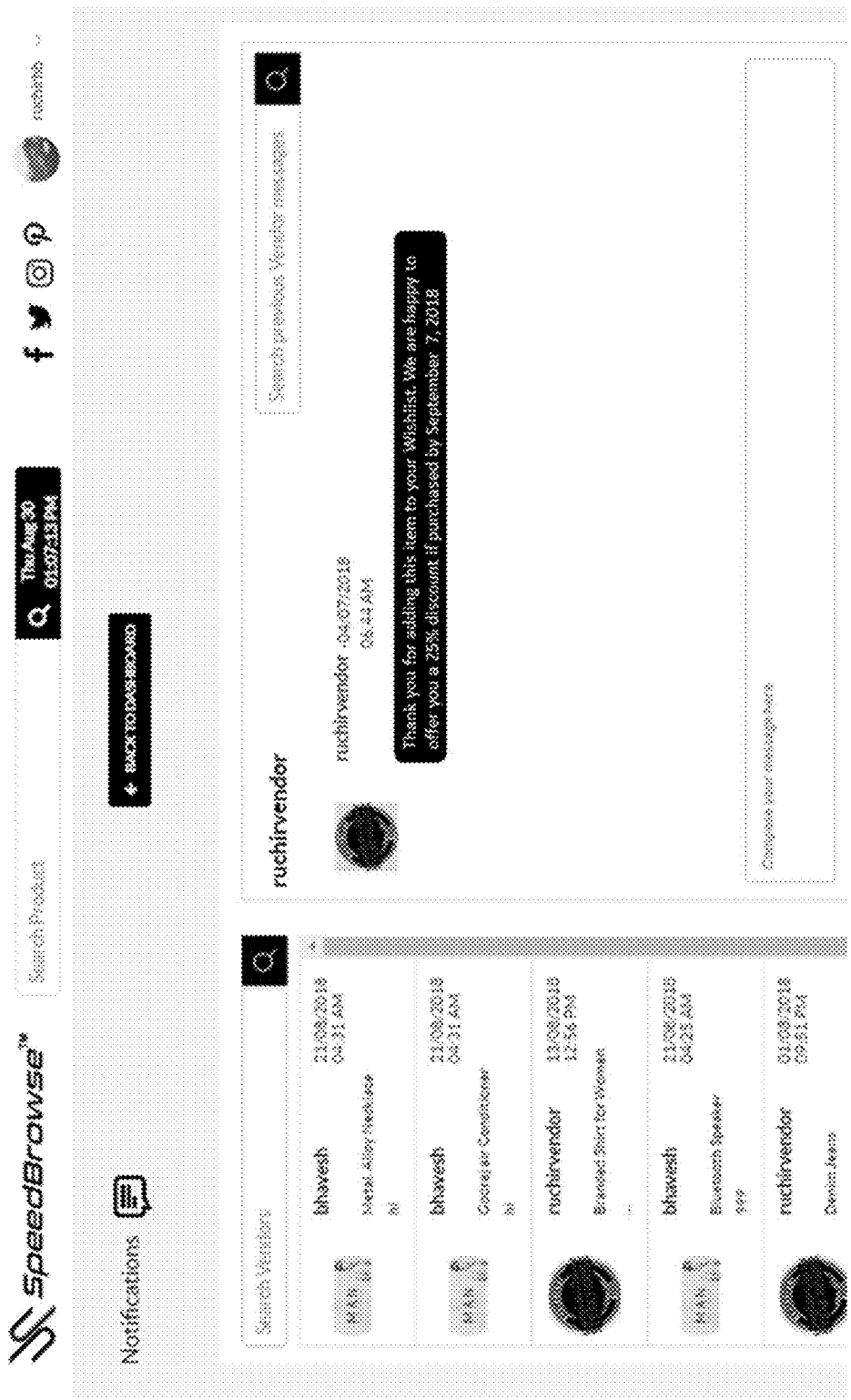
FIG. 10 is a user interface illustrating a notifications interface according to an embodiment of the present disclosure.

The present disclosure also provides a notifications interface where each user can communicate with third parties such as vendors, manufacturers, and other users. FIG. 10 is a user interface illustrating a notifications interface according to an embodiment of the present disclosure. In one embodiment, the system is anonymous. That is, a user can receive offers from vendors through the anonymous system wherein vendors only know the users by their nickname.

Figure 11:
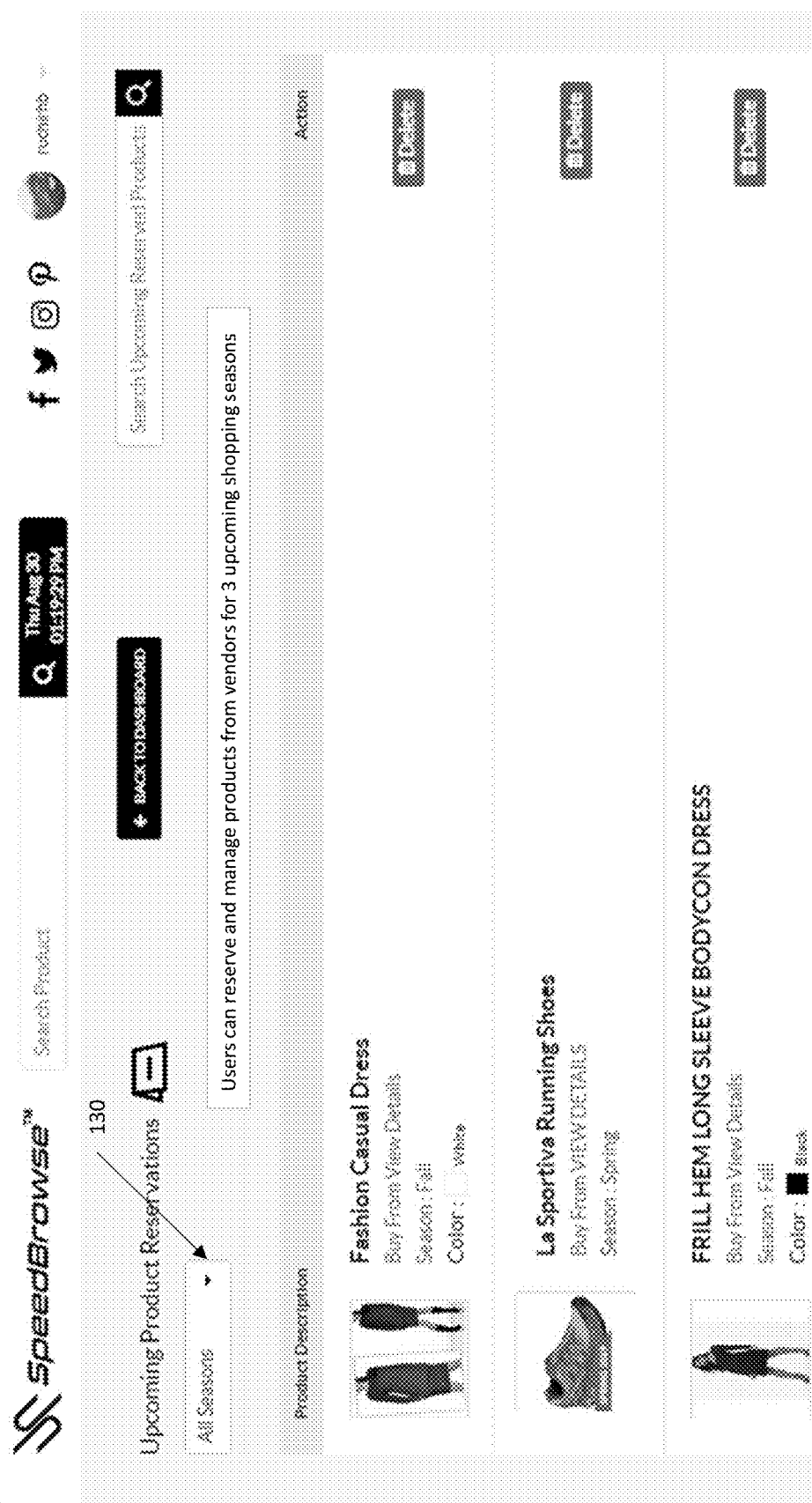
FIG. 11 is a reservations interface according to an embodiment of the present disclosure.

In a further embodiment, as show in in FIG. 11, users can reserve and manage products from vendors for upcoming shopping seasons. In a preferred embodiment, users can reserve and manage products from vendors for 3 upcoming shopping seasons. The system further provides a season dropdown 130 where users can filter the results to specific upcoming shopping seasons. From the same screen, users can search for a specific item or delete any items they no longer wish to reserve.

Manufacturer Product Interface

Figure 12:
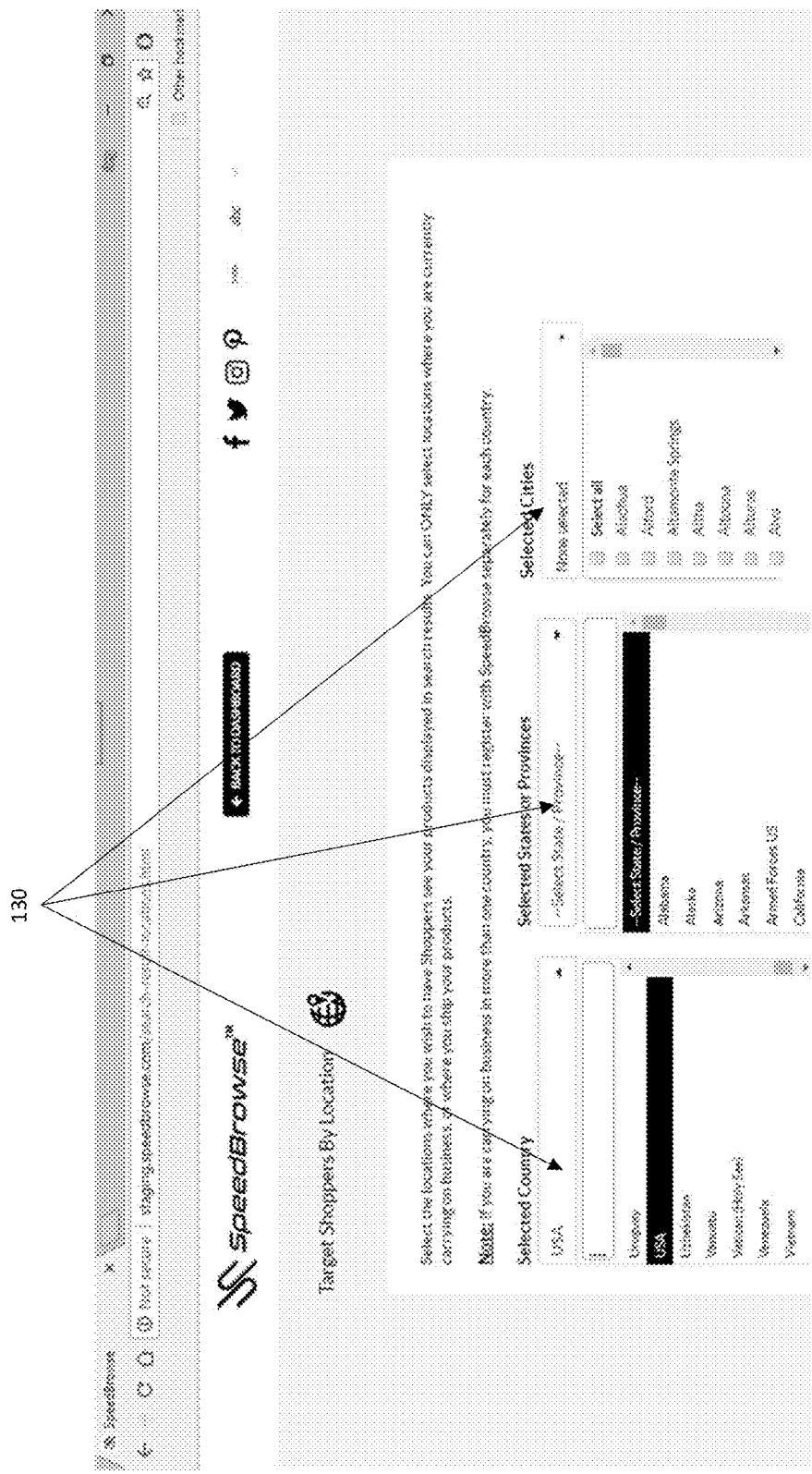
FIG. 12 is a target shopper by location interface according to an embodiment of the present disclosure.

The present disclosure also provides systems for manufacturers to target their desired audiences. FIG. 12 is a target shopper by location interface according to an embodiment of the present disclosure. Manufacturers and Wholesalers can select which location(s) where they have stores selling their products through targeting dropdowns 130. The products they manufacture will show up in the search results where locations are selected. Manufacturers and Wholesalers can select one entire country and/or countries—all the way to only 1 city within a specific country.

Figure 13:
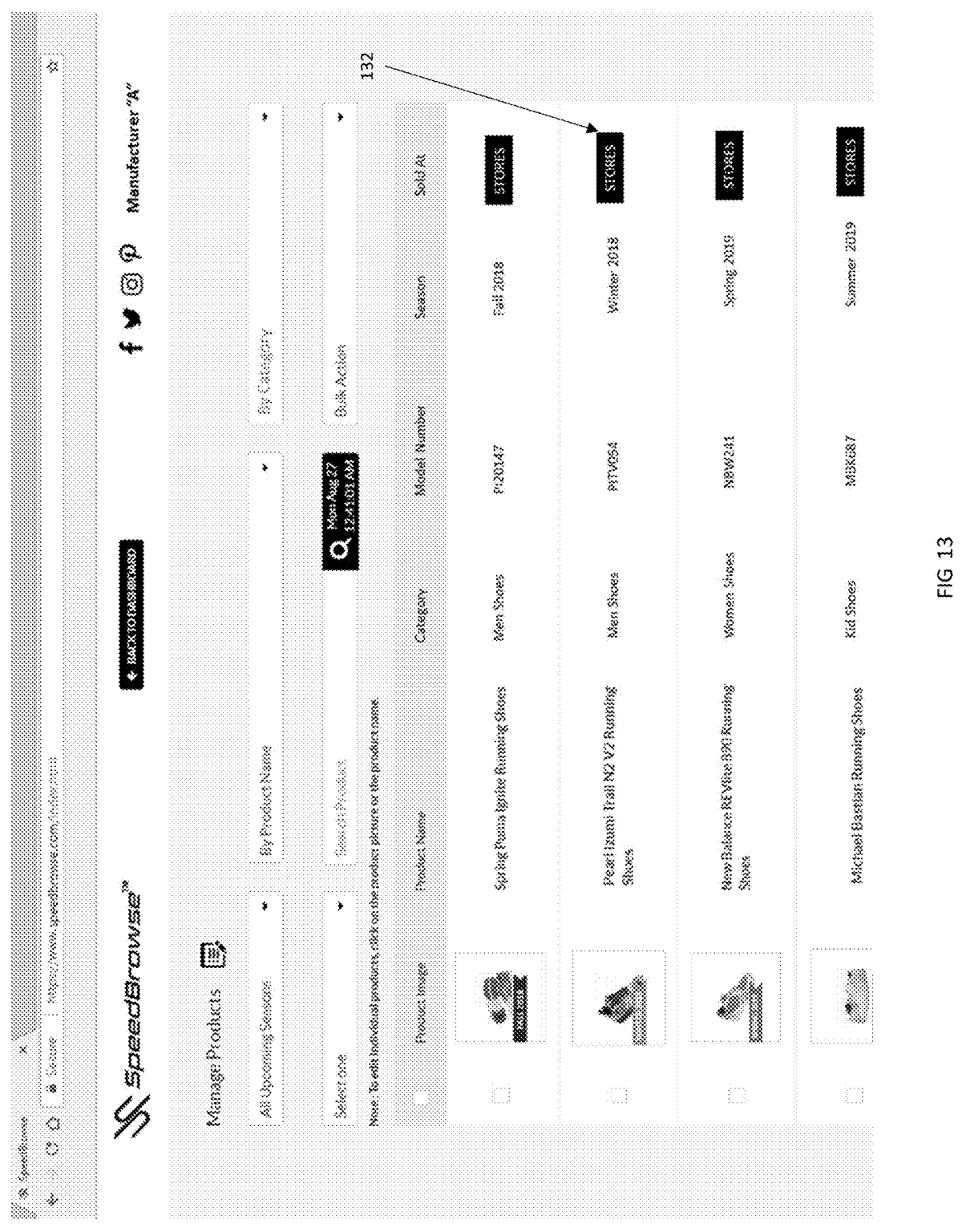

FIG. 13 is a manage products interface according to an embodiment of the present disclosure. When manufacturers upload their products on the system, they have the ability to add all the stores around the world that are selling each item they manufacture or distribute. The system will facilitate the management of which stores sell each product by accessing it through the "STORES" buttons, for example Stores button 132. Clicking on "Stores" button 132 will bring up the stores where the specific item is sold (product stores interface). Manufacturers are also able to filter by country, state/province and city.

Figure 14:
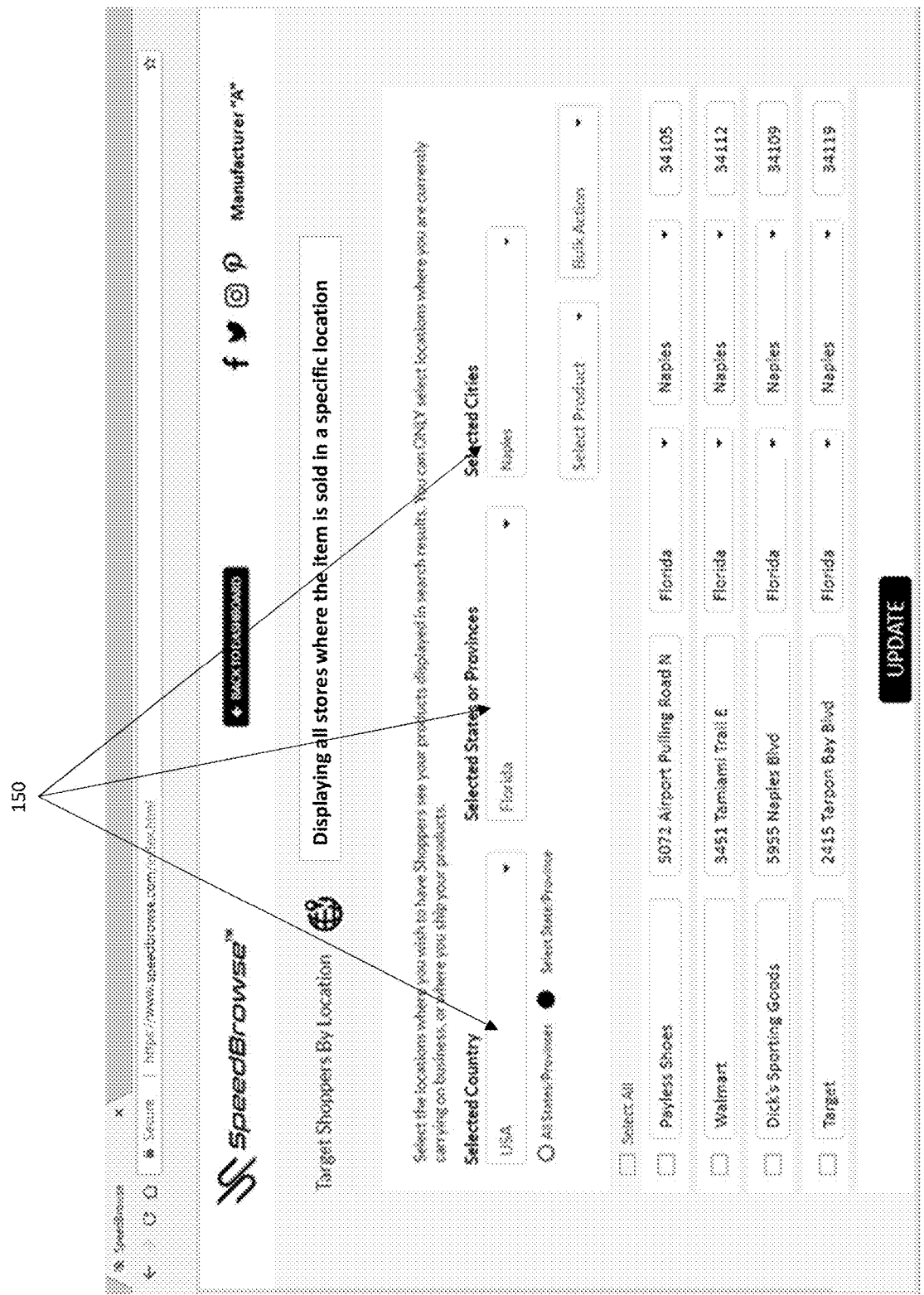
FIG. 14 is a product stores interface for a product according to an embodiment of the present disclosure.

FIG. 14 is a product stores interface for a product according to an embodiment of the present disclosure. In one embodiment, the product stores interface displays all stores where the manufactured or distributed item is sold in a specific location. Users can change the query by changing the location via location dropdowns 150. Alternatively, users can select all states/provinces.

Figure 15:
FIG. 15 is a product stores interface for a product showing a product selection interface.

In a further embodiment, Manufacturers and Wholesalers can manage the stores where their products are sold (either one by one) or using Bulk Actions. FIG. 15 is a product stores interface for a product showing a product selection interface. Manufacturers and Wholesalers can select as many products as they want in one location via a select products dropdown 152 and perform a bulk action via bulk action drop down 153. The bulk actions include Add, Delete, Activate, and Deactivate.

Figure 16:
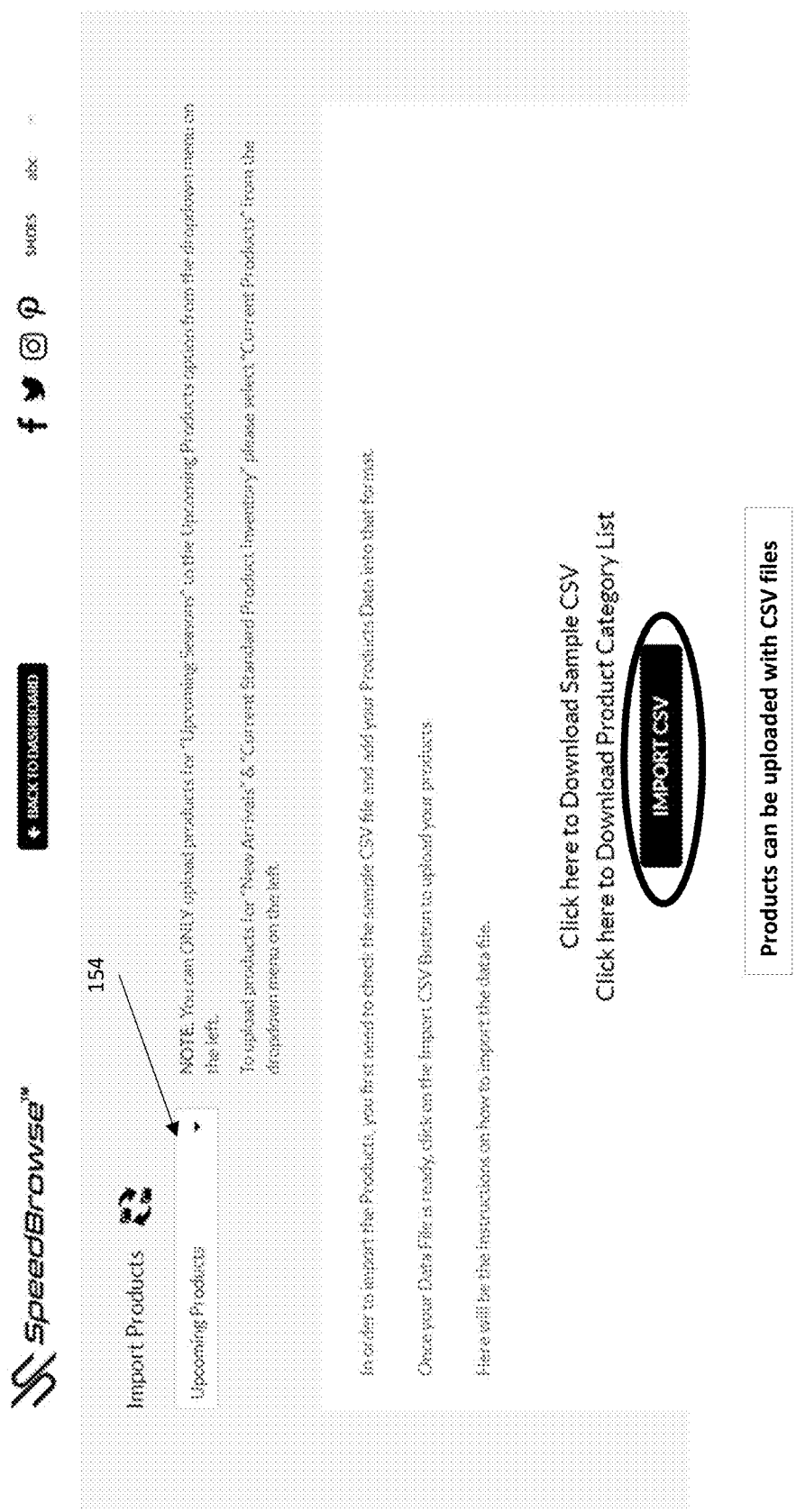
FIG. 16 shows an import products interface according to an embodiment of the present disclosure

Manufacturers and Wholesalers will also be able to, like Retailers, bulk upload/import products and product images using CSV files. FIG. 16 shows an import products interface according to an embodiment of the present disclosure. In order to import products, users import a spreadsheet file such as a CSV file via an IMPORT button. In one embodiment, users can only upload products for "Upcoming Seasons" by selecting Upcoming Products from dropdown 154. In a further embodiment, Retailers (not Wholesalers and Manufacturers users) can upload new arrivals, items on sale and current standard product inventory by selecting those options from dropdown 154.

Searching from Manufacturers and Wholesalers Instead of Retailers

Systems disclosed in the present disclosure also allow users to search directly from manufactures and wholesalers instead of retailers. It can be appreciated that such functionality creates a new stream of commerce that benefits users and manufacturers, wholesalers as well as retailers who can now better target their users and more efficiently stock and warehouse various products.

Figure 17:
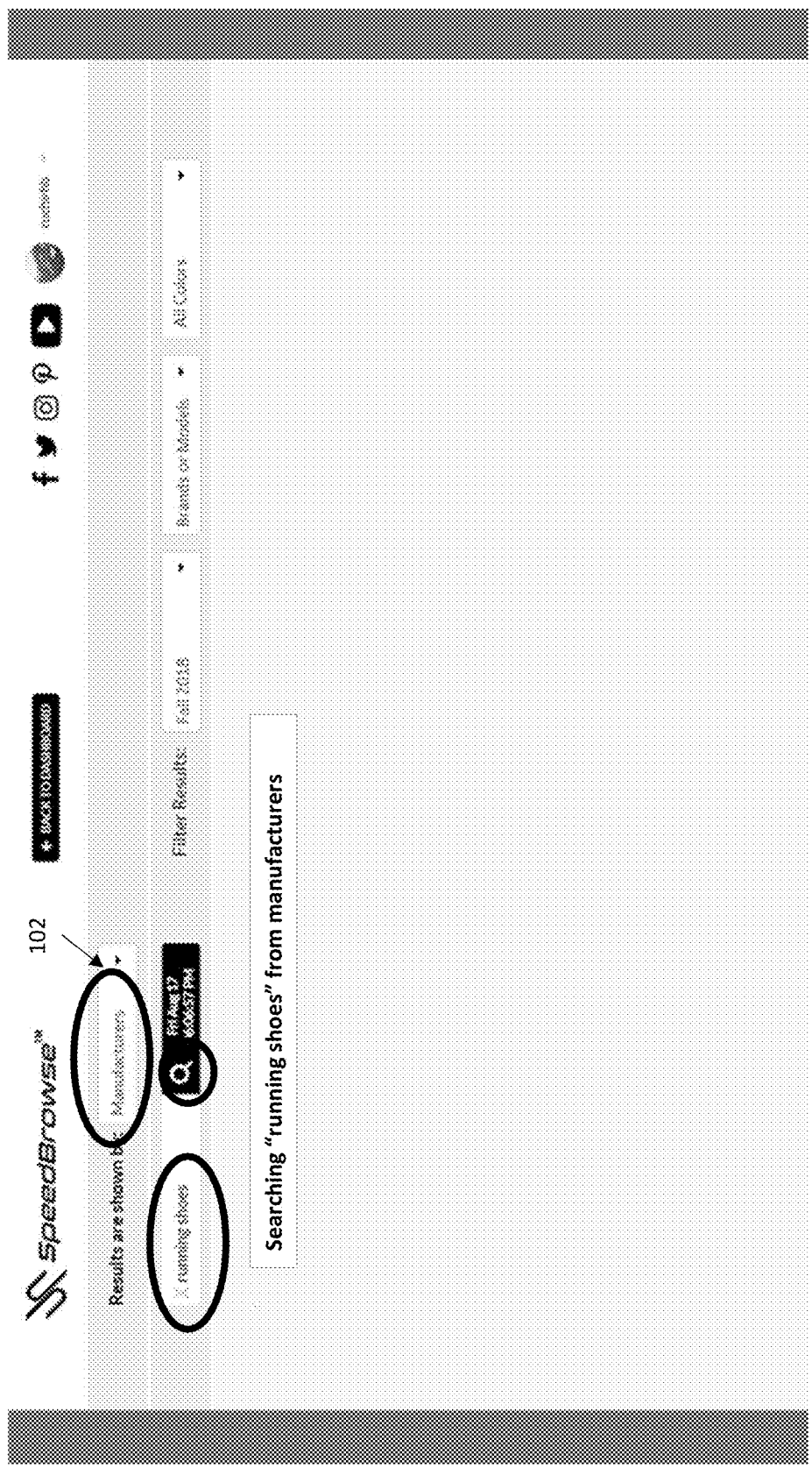
FIG. 17 is a user interface illustrating a search by Manufacturers according to one exemplary embodiment of the present invention.

FIG. 17 is a user interface illustrating a search by Manufacturers according to one exemplary embodiment of the present invention. From dropdown 102, a user selects Manufacturers and enters in a search query such as "running shoes."

Figure 18:
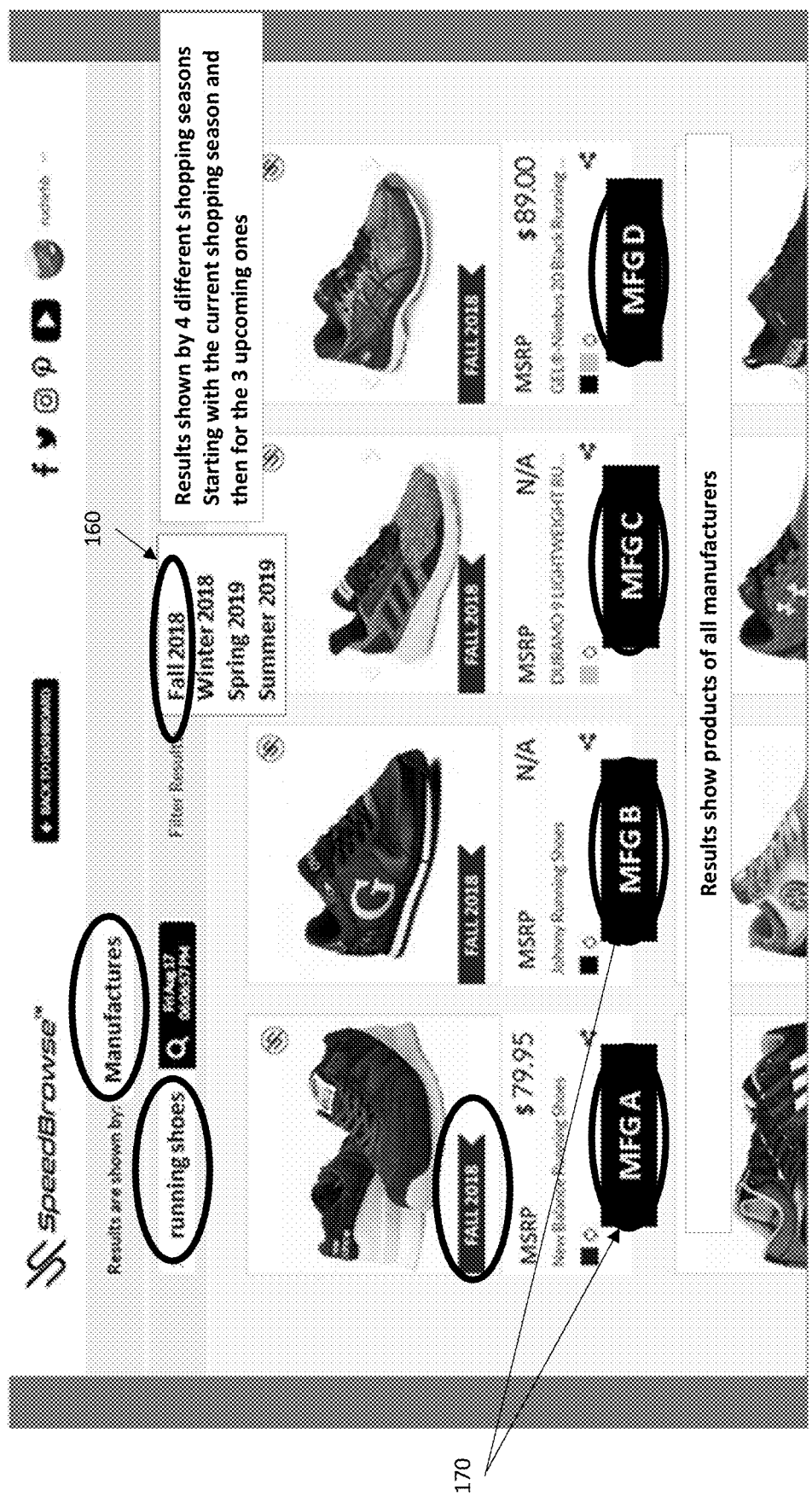
FIG. 18 is a search results page illustrating a search by manufacturers.
Figure 19:
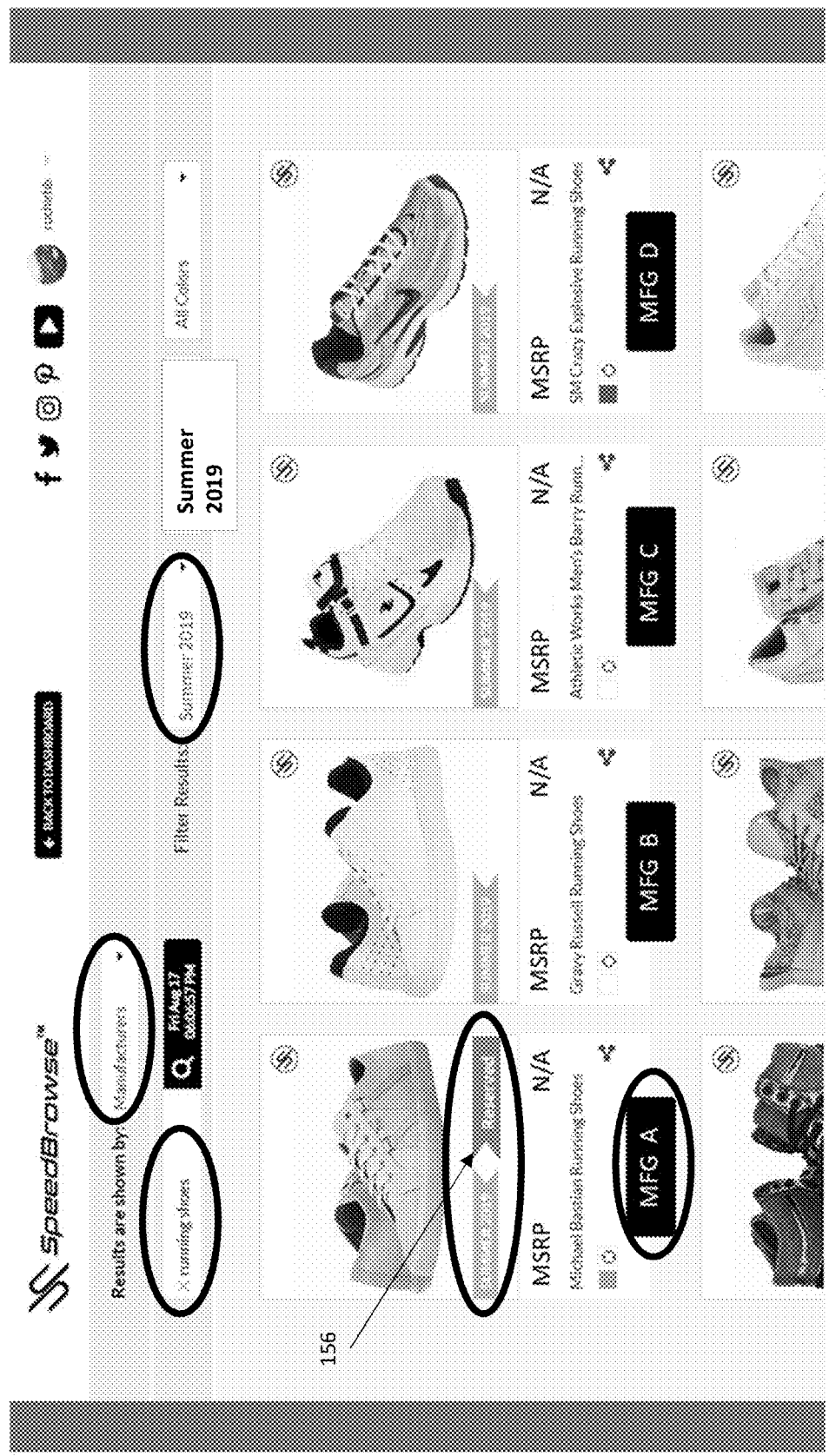
FIG. 19 is a user interface illustrating a search by Manufacturers filtered by a Summer 2019 season according to an exemplary embodiment of the present invention.
Figure 20:
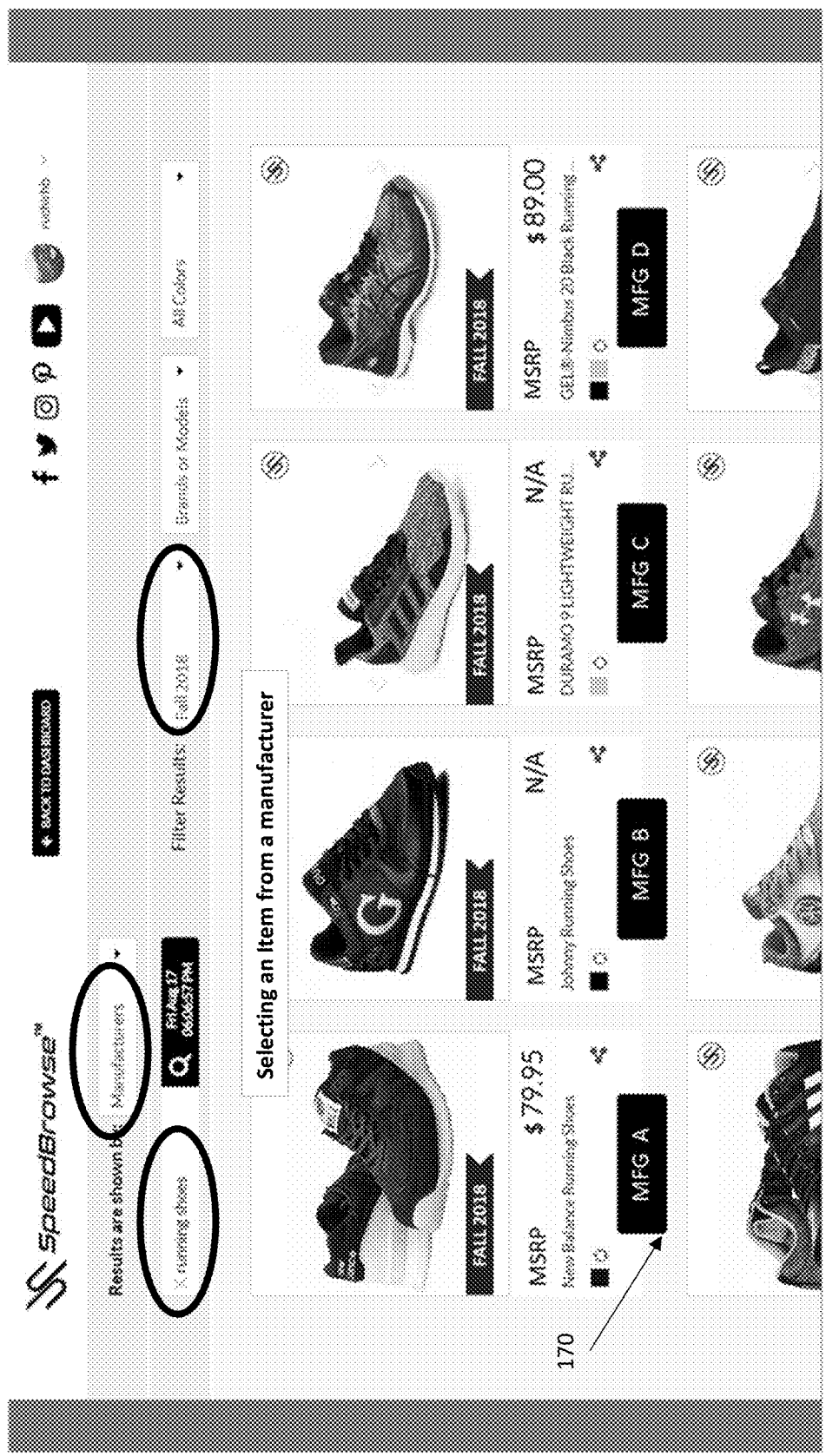
FIG. 20 is a user interface illustrating a search by Manufactures filtered by a Fall 2018 season according to an exemplary embodiment of the present invention.

By default, results from manufacturers and wholesalers always show products for the current shopping season 160 first which products are currently sold as new arrivals in retail stores. A user can view an item by either clicking on a "Manufacturer or Wholesale Name" button 170 or the Product Image. A separate view details button appears for each item. Clicking the view details button 170 will take the user to an item details page. FIG. 18 is a search results page illustrating a search by manufacturers, (or for a search by wholesalers as it works identically as manufacturers), according to an embodiment of the present disclosure. The results show products of the search query by all manufacturers. In one embodiment, results shown by 4 different shopping seasons, starting with the current shopping season and then for the 3 upcoming seasons. A user can filter the search results via season filter dropdown 160. FIG. 19 is a user interface illustrating a search by Manufacturers filtered by a Summer 2019 season according to an exemplary embodiment of the present invention. In this example, the user has reserved 1 product 156. FIG. 20 is a user interface illustrating a search by Manufactures filtered by a Fall 2018 season according to an exemplary embodiment of the present invention. A user can select an item from manufacturer, for example by pressing on MFG button 170, or the item picture, which takes the user to a manufacturer viewing details interface of the selected item which was posted by the Manufacturer.

Figure 21:
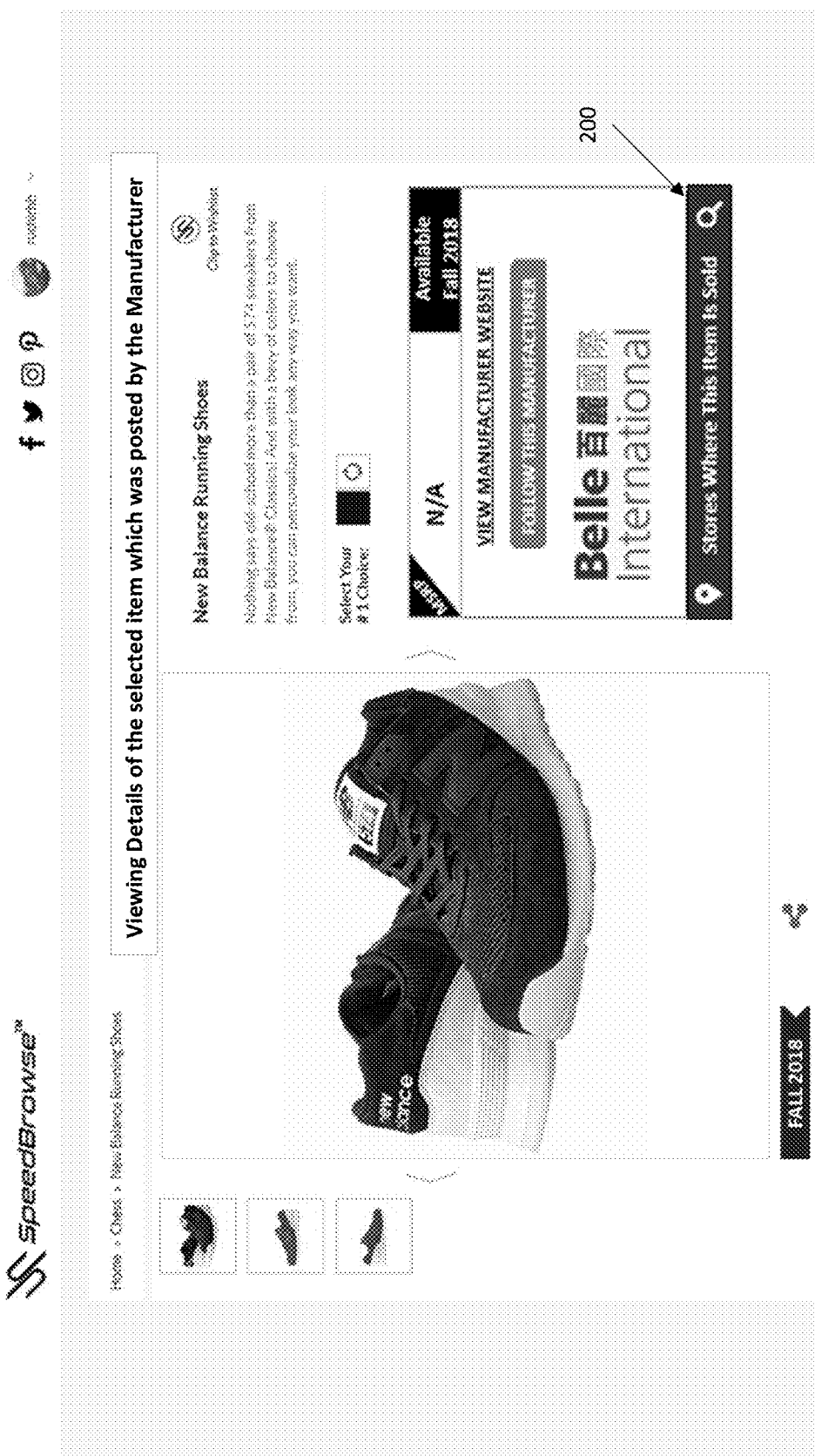
FIG. 21 is a manufacturer viewing details interface of a selected item. A user can find nearby stores selling the selected item by clicking on button 200 to find "Stores Where This Item Is Sold".
Figure 22:
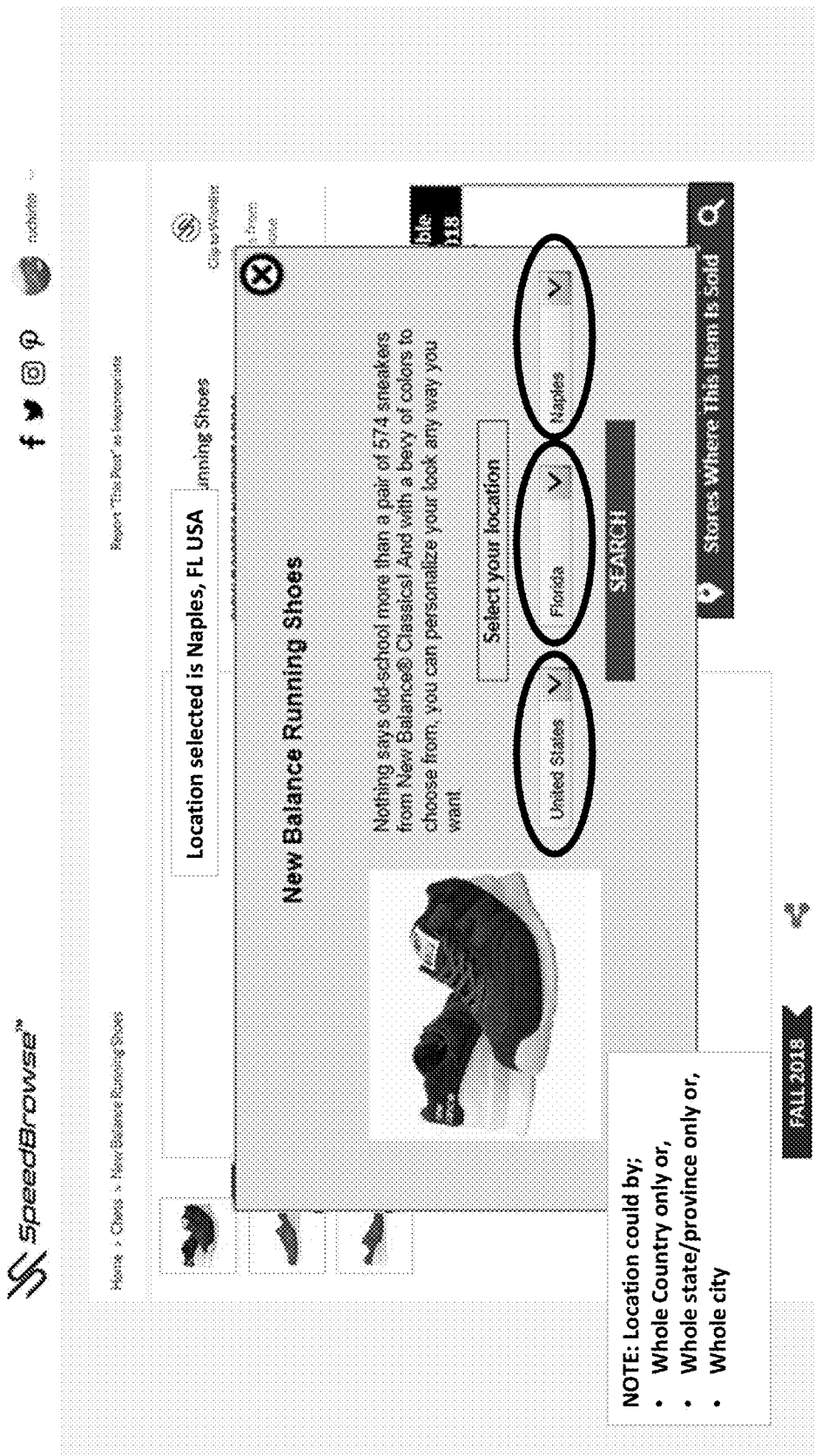
FIG. 22 is a user interface illustrating a pop-up to select a location where the user is searching for stores.

FIG. 21 is a manufacturer viewing details interface of a selected item. A user can find nearby stores selling the selected item by clicking on button 200 to find "Stores Where This Item Is Sold". In one embodiment, clicking on button 200 will bring up a pop-up to select a location where the user is searching for stores. FIG. 22 is a user interface illustrating a pop-up to select a location where the user is searching for stores. In one embodiment, the location could be by whole Country only or whole state/province only or, whole city. Pressing search will then display results of the stores selling the product FIG. 23 is a user interface displaying results of the stores selling a targeted product from a manufacturer or wholesaler. In one embodiment, clicking "SEARCH" will search all stores with "ONLY ONE CLICK" no matter how many stores are in the search criteria.

Figure 24:
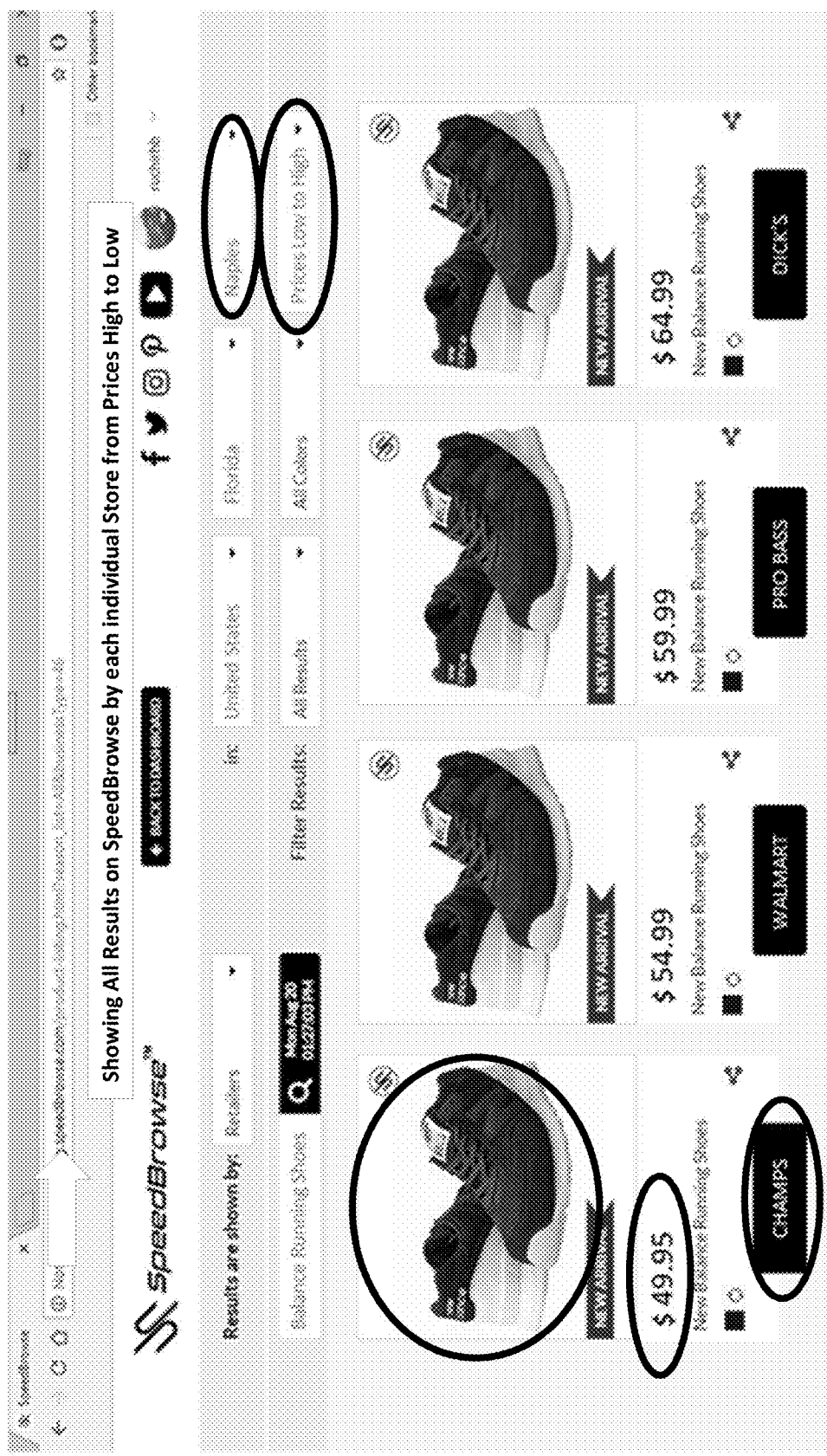
FIG. 24 is a user interface displaying search results of the stores selling a targeted product from a manufacturer or wholesaler.

FIG. 24 is a user interface displaying search results of the stores selling a targeted product from a manufacturer or wholesaler. In one embodiment, users can display the results from low to high. Clicking on a store takes the user to a detail page for the item.

Figure 25:
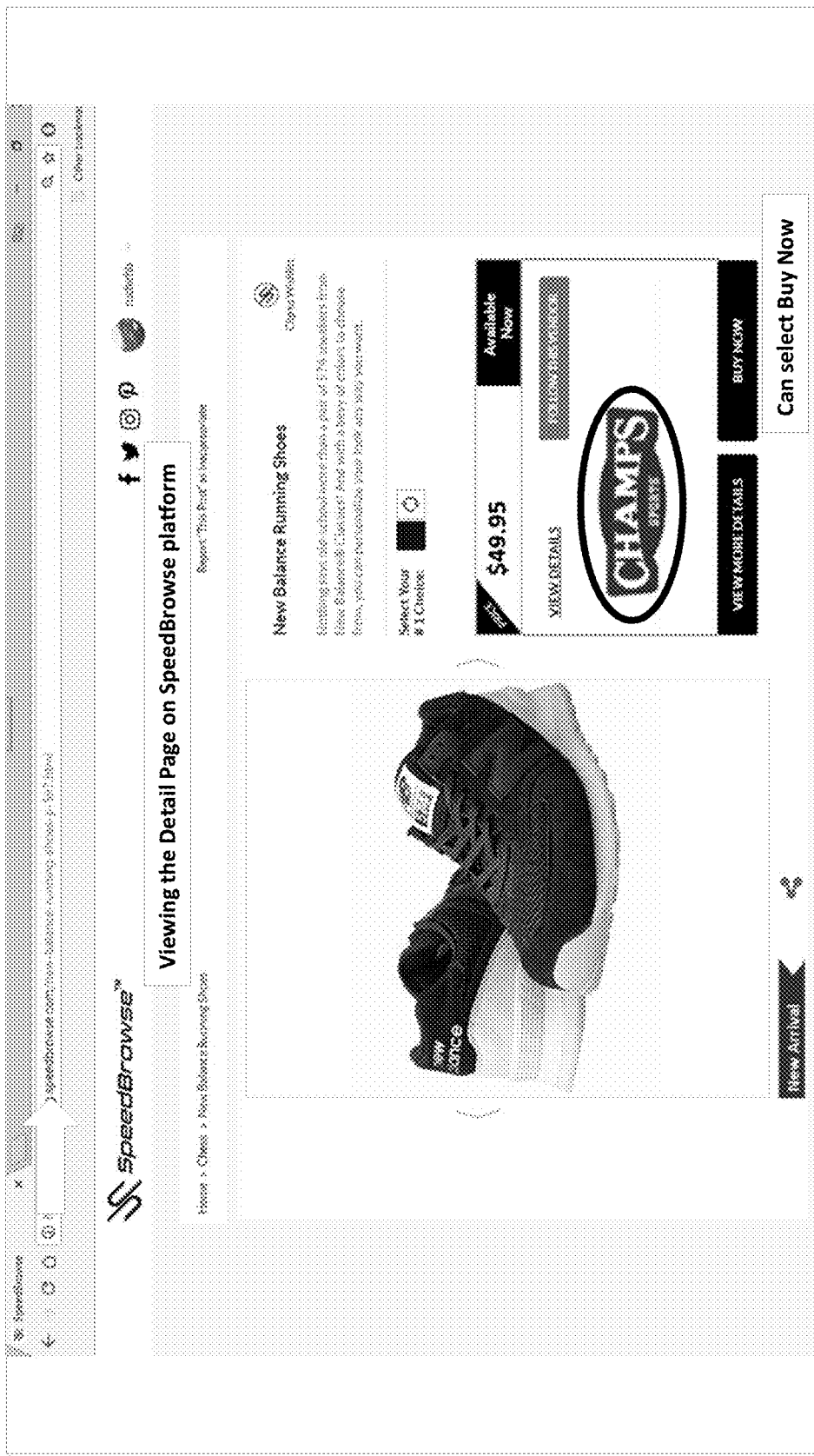
FIG. 25 shows the detail page for a specific item.
Figure 26:
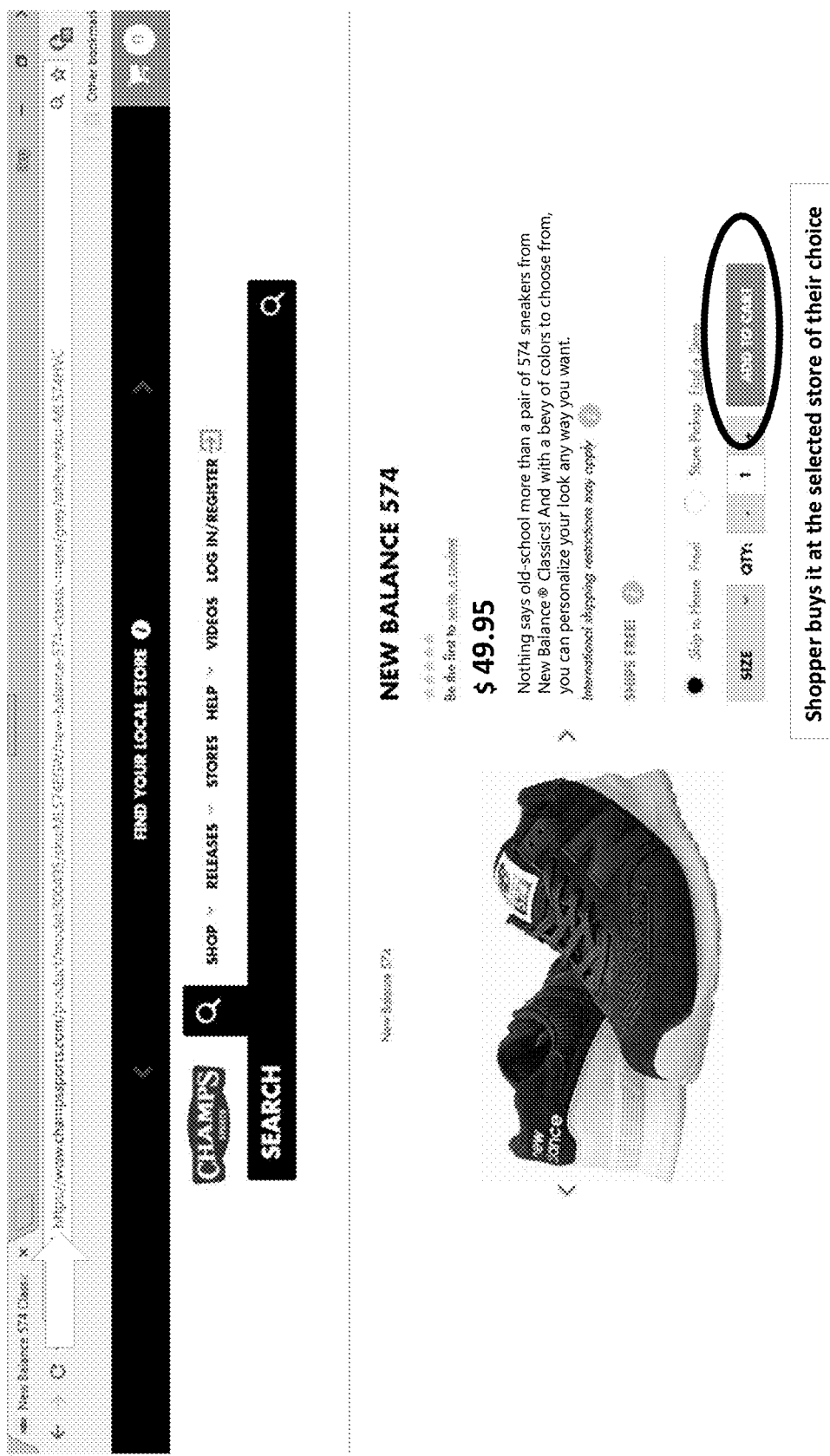
FIG. 26 is a store website displaying an item and an ADD TO CART button.

FIG. 25 shows the detail page for the item. A user who wants to buy an item can select buy now, which then takes the user to the store' website detail page of the item where they can buy the item. FIG. 26 is a store website displaying an item and an ADD TO CART button.

Retailers, Manufacturers and Wholesalers Live Analytics Technology

Figure 27:
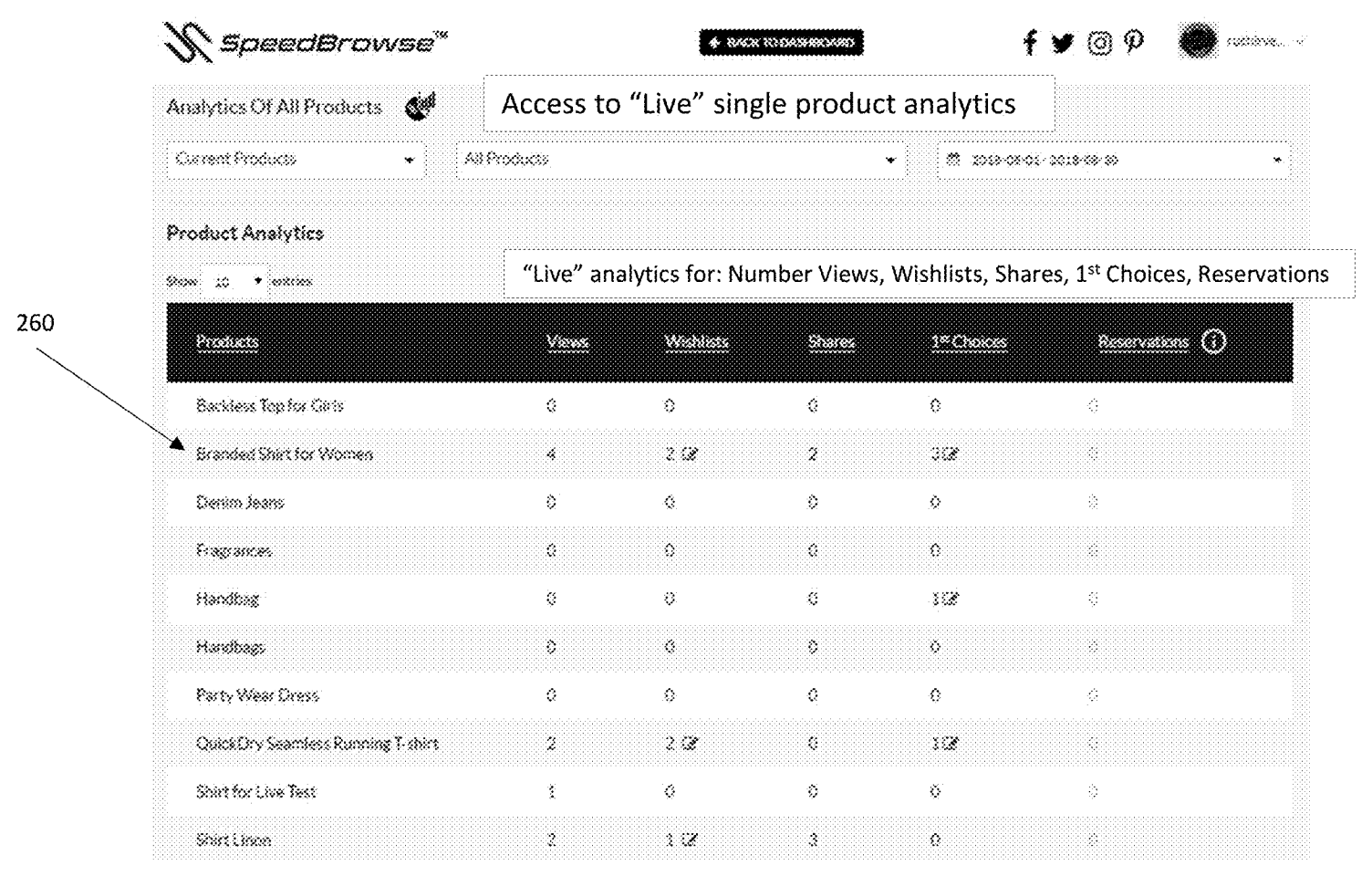

The systems of the present disclosure also provide live analytics to Retailers, Manufacturers and Wholesalers. FIG. 27 is a user interface displaying live product analytics across a range of single products. In an embodiment, the system provides live analytics for: Number Views, Wishlists, Shares, 1st Choices, and Reservations—present if they are currently listed in any upcoming shopping seasons and past reservations when they were reserved during the time they were listed in past upcoming shopping seasons. Clicking on a product 260 will take the user to a single detail product analytics interface.

Figure 28:
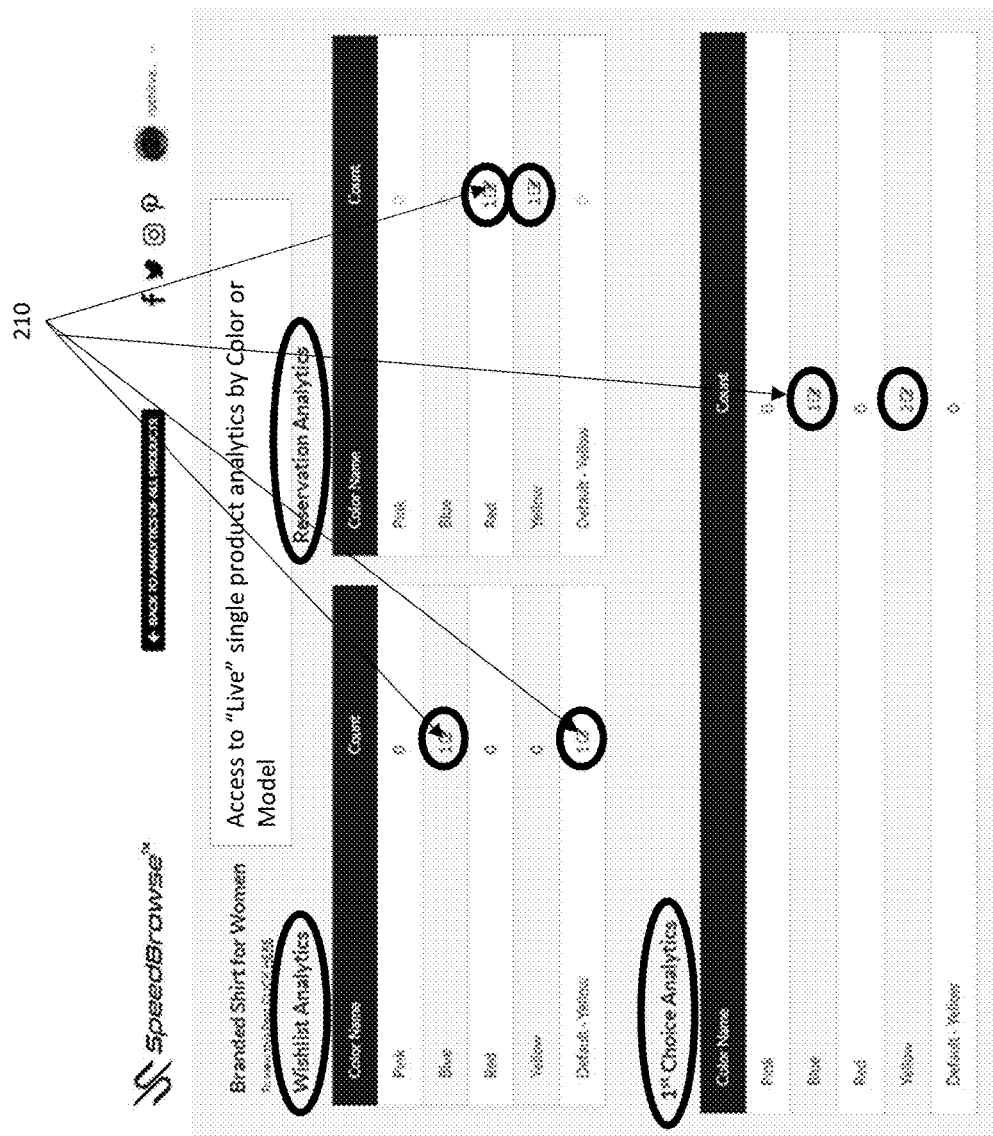
FIG. 28 is a single detail product analytics interface page.
Figure 29:
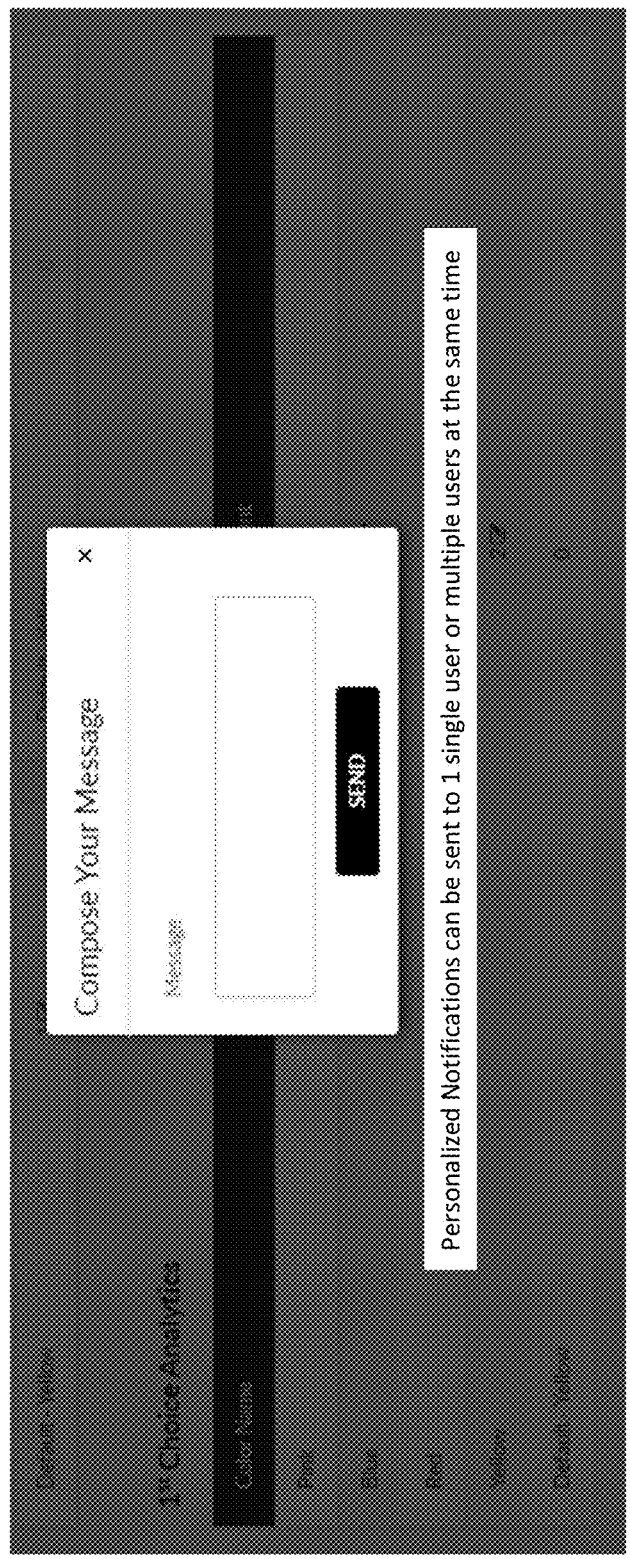
FIG. 29 is an anonymous message popup where a message can be sent to all users, or a specific user, in the desired item category.

FIG. 28 is a single detail product analytics interface page. Embodiments of the present disclosure provide for access to live single product analytics by color or model, and broken down into Wishlist analytics, Reservation analytics, and First choice analytics. From the same page, messages can be sent to any users who have the specific item in their wishlist, reservation, or selected as their first choice. In one embodiment, a vendor can send a message to a shopper, wherein the identity of the shopper is anonymous. In one embodiment, Anonymous Messages can be sent to anyone by clicking on an icon 210 next to an item category. FIG. 29 is an anonymous message popup where a message can be sent to all users, or a specific user, in the desired item category. The recipient of the message remains anonymous, not the vendor.

Figure 30:
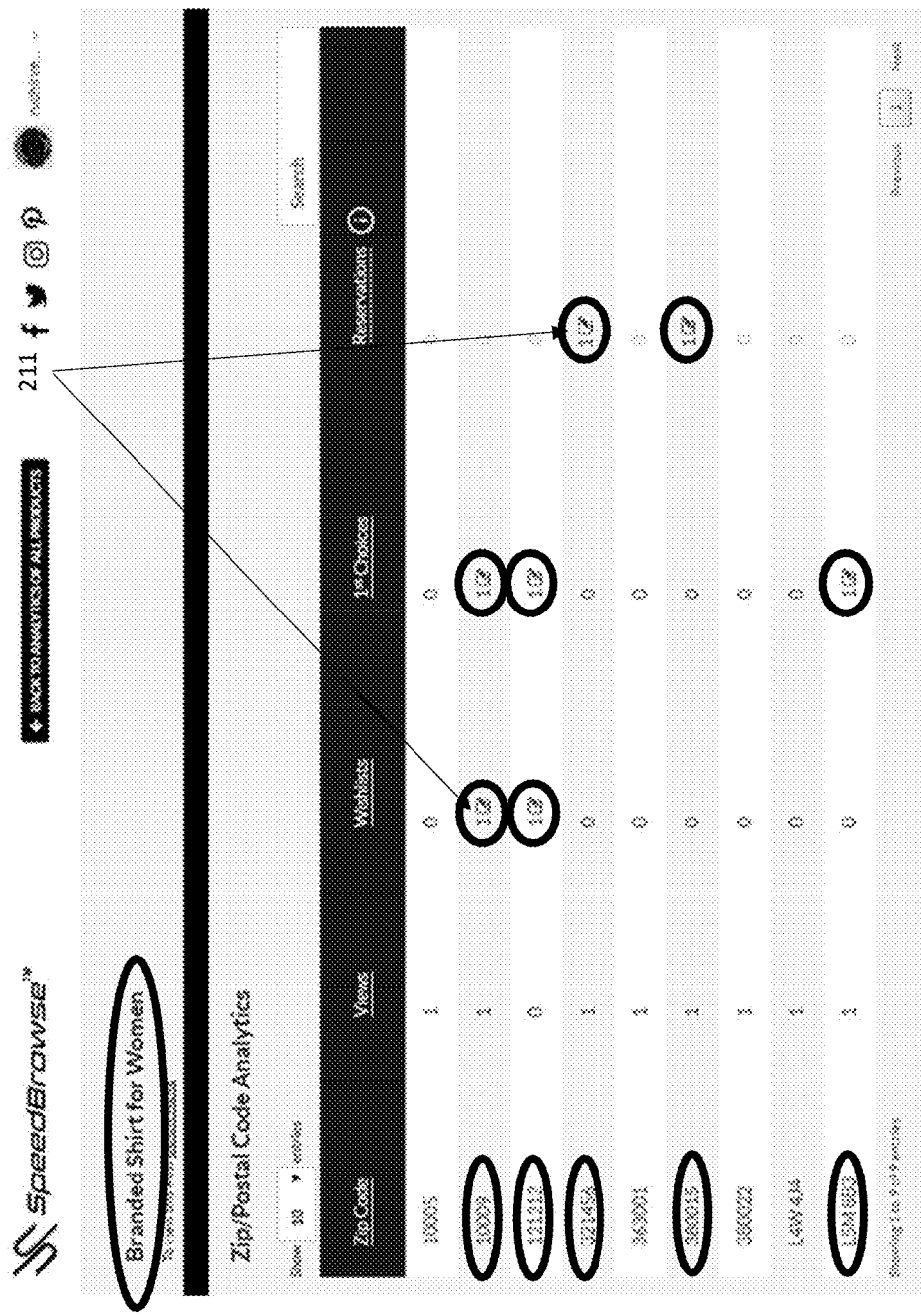
FIG. 30 is a single product zip code analytics interface page.
Figure 31:
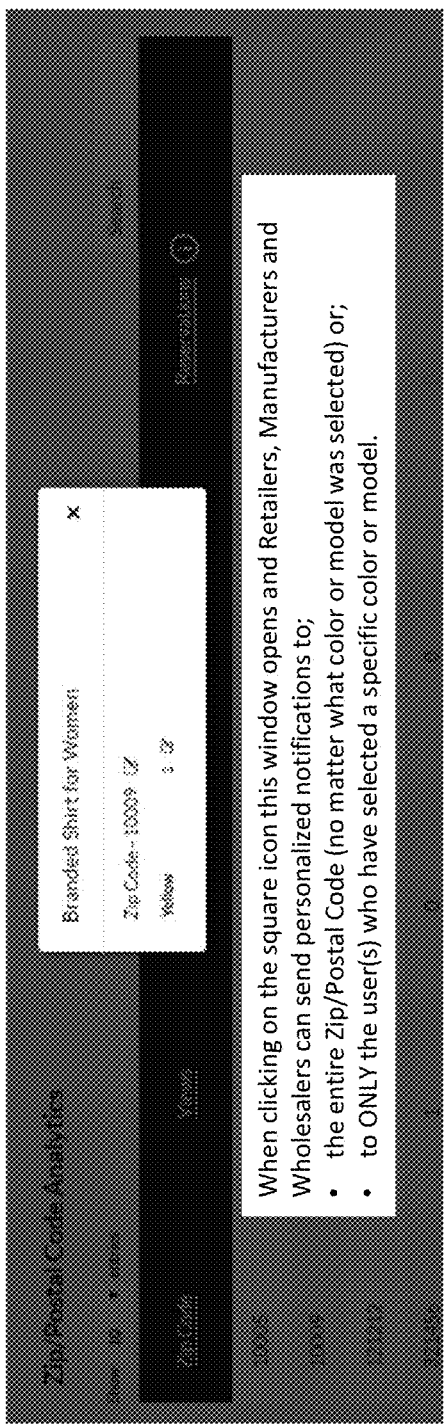
FIG. 31 is an anonymous message by zip code popup.

Analytics of single products Wishlists, first choices, and reservations can also be tracked by color or model specifically within each Zip or Postal Code. FIG. 30 is a single product zip code analytics interface page. Disclosed are anonymous users by zip code who made the selection, wherein Retailers, Manufacturers and Wholesalers can send these users messages and/or offers. In this embodiment, they send messages to the users by pressing icon 211 within the desired item category. When clicking on the icon 211 the window shown it FIG. 30 opens and retailers, manufacturers and wholesalers can send personalized notifications to either the entire Zip/Postal Code (no matter what color or model was selected) or to only the user(s) who have selected a specific color or model. FIG. 31 is an anonymous message by zip code popup.

Figure 32:
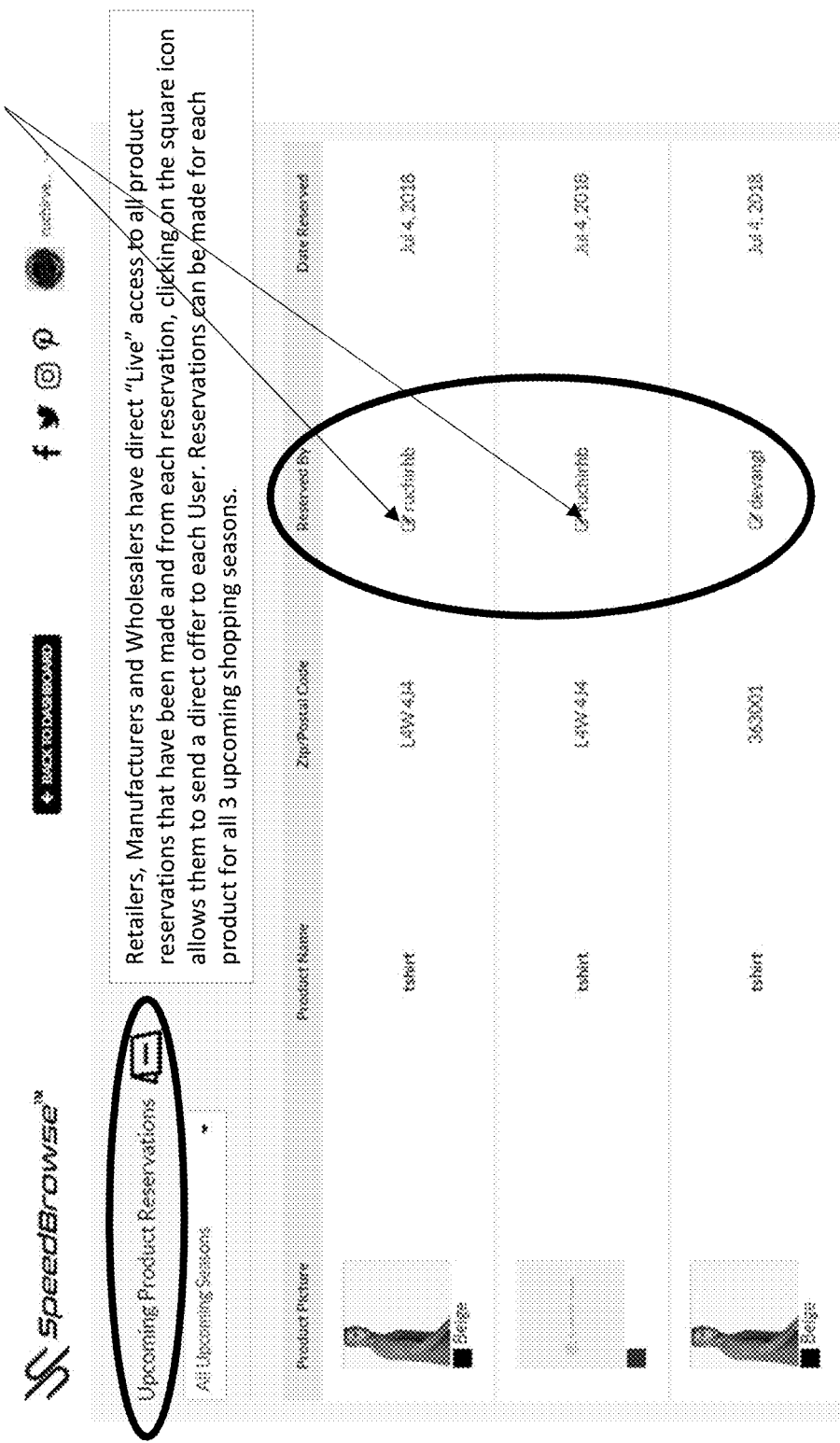
FIG. 32 is a page that shows "Live" access to all product reservations that have been made.

The present disclosure also provides Retailers, Manufacturers and Wholesalers with direct "Live" access to all product reservations that have been made, as show in FIG. 32. From each reservation, clicking on icon 212 allows them to send a message or offer to each user. It can be appreciated than in a specific embodiment of the present disclosure, reservations can be made for each product for all 3 upcoming shopping seasons.

Figure 33:
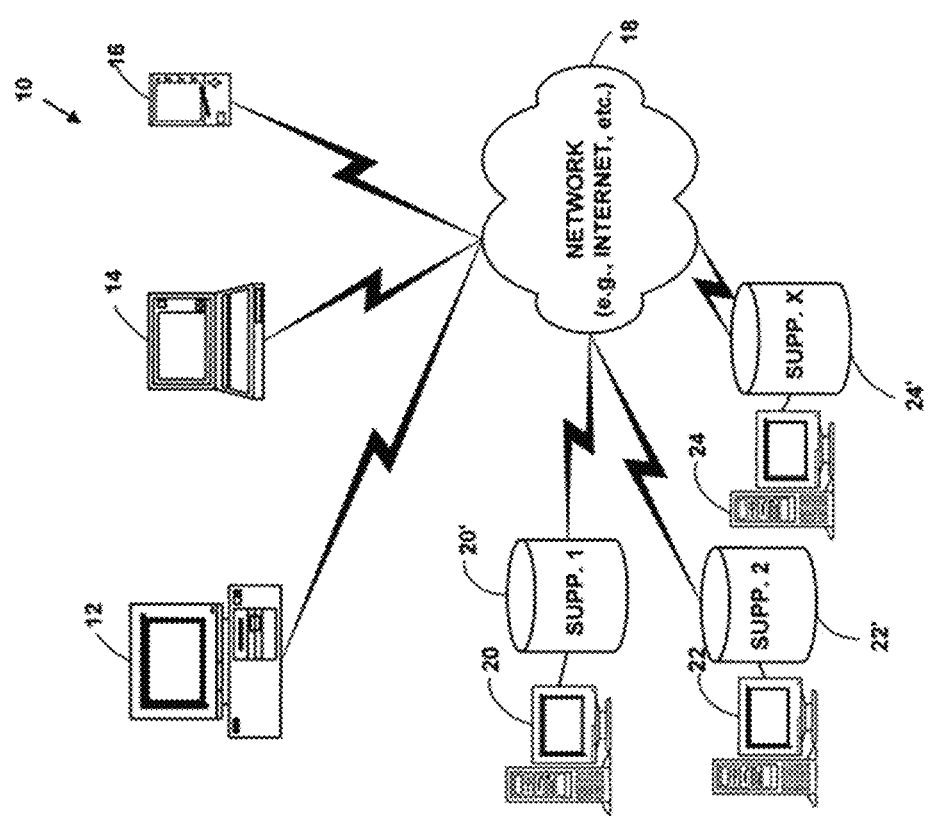
FIG. 33 is an architecture diagram.

FIG. 33 is an architecture diagram. The user interfaces disclosed can be implemented via a product reservation system 10 includes one or more client network devices 12, 14, 16 (only three of which are illustrated). The client network devices 12, 14, 16 include, but are limited to, personal computers, wireless telephones, personal information devices, personal digital assistants, hand-held devices, network appliances, and other types of electronic devices. However, the present invention is not limited to these devices and more, fewer or equivalent types of client electronic devices can also be used. The client network devices 12, 14, 16 can represent shoppers as well as vendors and are in communications with a computer network 18 (e.g., the Internet, intranet, etc.). In one embodiment, vendors are manufactures of products.

The communication includes, but is not limited to, communications over a wire connected to the client network devices, wireless communications, and other types of communications. Plural server network devices 20, 22, 24 associated with one or more associated databases include reservation and/or pricing information for goods that may be supplied by plural vendors 20', 22', 24'.

An operating environment for components of the electronic option system 10 for preferred embodiments of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

Modifications, additions, or omissions may be made to the systems, apparatuses, and/or methods described herein without departing from the scope of the disclosure. For example, various components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for reserving goods, comprising:
   a server network device provides to a shopper client network device via a computer network, an option to search by retailer or manufacturer, wherein the shopper client filters the results by their geographic area displaying results on a search results page of the shopper client network device by new arrivals first, items on sale second, and standard inventory third, wherein from the search results page, and with only 1 click, the shopper client network device can filter by upcoming season;
   providing a wishlist to the shopper client network device, wherein the shopper client network device can add an item from the filtered results to their user wishlist and make said item the first choice in their wishlist, wherein items in a user's wishlist can be selected as private or public, and wherein a public wishlist is searchable by other users;
   providing an option to purchase said item if it is available for purchase, wherein the user is then redirected to a vendor website via a presubmitted URL.

2. The method of claim 1, further comprising providing a user interface for vendors to pre-post future releases for 3 upcoming shopping seasons.

3. The method of claim 2, further comprising providing an option to reserve said item.

4. The method of claim 3, wherein reserving can be either public or private.

5. The method of claim 4, wherein marking a product as a first choice automatically saves the product to the shopper's wishlist.

6. The method of claim 5, further comprising providing a vendor user real time analytics on every product sold.

7. The method of claim 6, wherein the real time analytics further comprise the number of viewers per item as well as how many users added the item to a shopper wishlist.

8. The method of claim 7, further comprising providing a notification system to alert shoppers targeted by a geolocation.

9. The method of claim 8, wherein the notification system only notifies shoppers who have added a product to a shopper wishlist.

10. The method of claim 1, further comprising displaying new arrivals for up to 3 revolving upcoming shopping seasons, wherein the new arrivals are searchable and none of the new arrivals are associated with a URL.

11. The method of claim 1, further comprising a shopper client network device receiving an anonymous message from a vendor.

* * * * *